March 5, 1957 R. C. WEIDE 2,784,265

CONTROLLER

Filed Aug. 6, 1954 13 Sheets-Sheet 1

INVENTOR
Rudolph C. Weide
BY
L. C. Thorpe
ATTORNEY

March 5, 1957

R. C. WEIDE 2,784,265

CONTROLLER

Filed Aug. 6, 1954

13 Sheets-Sheet 2

INVENTOR
Rudolph C. Weide
BY
S. C. Thorpe
ATTORNEY

March 5, 1957 R. C. WEIDE 2,784,265

CONTROLLER

Filed Aug. 6, 1954 13 Sheets-Sheet 3

INVENTOR
Rudolph C. Weide
BY
J. C. Thorpe
ATTORNEY

March 5, 1957 R. C. WEIDE 2,784,265

CONTROLLER

Filed Aug. 6, 1954 13 Sheets-Sheet 4

INVENTOR
Rudolph C. Weide
BY S. C. Thorpe
ATTORNEY

March 5, 1957 R. C. WEIDE 2,784,265

CONTROLLER

Filed Aug. 6, 1954 13 Sheets-Sheet 5

INVENTOR
Rudolph C. Weide
BY S. C. Thorpe
ATTORNEY

March 5, 1957

R. C. WEIDE 2,784,265

CONTROLLER

Filed Aug. 6, 1954

13 Sheets-Sheet 6

INVENTOR
Rudolph C. Weide
BY S. C. Thorpe
ATTORNEY

March 5, 1957 R. C. WEIDE 2,784,265

CONTROLLER

Filed Aug. 6, 1954 13 Sheets-Sheet 7

INVENTOR
Rudolph C. Weide
BY
J. C. Thorpe
ATTORNEY

INVENTOR
Rudolph C. Weide
BY J. C. Thorpe
ATTORNEY

March 5, 1957 R. C. WEIDE 2,784,265

CONTROLLER

Filed Aug. 6, 1954 13 Sheets-Sheet 9

INVENTOR
Rudolph C. Weide
BY S. C. Thorpe
ATTORNEY

March 5, 1957

R. C. WEIDE

CONTROLLER 2,784,265

Filed Aug. 6, 1954

13 Sheets-Sheet 10

INVENTOR
Rudolph C. Weide
BY
S. C. Thorpe
ATTORNEY

March 5, 1957 R. C. WEIDE 2,784,265

CONTROLLER

Filed Aug. 6, 1954 13 Sheets-Sheet 11

Inventor
Rudolph C. Weide

By S. C. Thorpe
Attorney

INVENTOR
Rudolph C. Weide
BY
S. C. Thorpe
ATTORNEY

March 5, 1957 R. C. WEIDE 2,784,265

CONTROLLER

Filed Aug. 6, 1954 13 Sheets-Sheet 13

Inventor
Rudolph C. Weide

By S. C. Thorpe
Attorney

United States Patent Office 2,784,265

Patented Mar. 5, 1957

2,784,265

CONTROLLER

Rudolph C. Weide, La Grange, Ill., assignor to General Motors Corporation, Detroit, Mich., a corporation of Delaware Application August 6, 1954, Serial No. 448,330

13 Claims. (Cl. 200—5)

This invention relates generally to an electro-mechanic control, and more particularly to the master controller of a diesel electric locomotive. Although this controller will be illustrated and described in relation to locomotives and electromotive power, it will be apparent as the description proceeds that it has a much wider field of application.

It is well known that in a diesel electric locomotive the diesel prime mover drives a main direct current generator. The generator then supplies electric power to a plurality of traction motors directly connected to driving locomotive axles and wheels. The power which is supplied to the motors by the generator is usually transmitted through a plurality of power contactor switches. The operation of these switches must necessarily be controlled, and this is done either directly or indirectly by a master controller which must be so constructed as to operate these contactor switches in specified sequences and combinations. The controller is usually provided with a plurality of manually operated control handles to operate the power contactor switches in the aforementioned sequences and combinations. In order to properly safeguard the electric transmission system, the manual operations of these handles in sequence by the operator must be correctly timed. For this reason, it is preferable to mechanically interlock these handles against improper operation.

The locomotive controller, in addition to performing the functions outlined above, may be made to perform an increasing variety of functions. The variations, to mention a few, include changing the power contactor switching sequence and timing; providing for either automatic operation of the power contactor switches (known as automatic transition) or manual operation of the power contactor switches (called manual transition). The controller should be adapted to include or exclude, as required, dynamic brake controls including variations in the method of control. The controller may be made to provide for simultaneous control through suitable electrical connections of auxiliary locomotive units known as "booster units." These "booster units" may or may not also contain a controller. Other factors that must be considered when designing a controller are the construction and arrangement of the engineer's cab which differs in various types of locomotives. These constructions and arrangements usually require that the controller be of minium size and so arranged that it may be operated with the minimum of physical effort and attention on the part of the operator.

One of the basic requirements for a controller is that it incorporate a directional handle which when operated will determine whether the locomotive will be propelled in the forward or the reverse direction. This handle should preferably have three positions—forward, neutral and reverse. As already mentioned, the forward and reverse positions determine in which direction the locomotive will be propelled. The neutral position is provided for the purpose of disconnecting the traction motors, which propel the locomotive, from the main generator so that when the directional handle is in the neutral position the locomotive cannot be propelled in either direction. By providing for removal of the directional handle when in the neutral position, the controller may be rendered inoperative to prevent its operation by unauthorized personnel.

A second requirement for a controller is that it should have a throttle handle. In the present invention, the throttle handle is movable in a specified number of steps with definite indexing of the steps to control the diesel engine and consequently locomotive speed. These steps are several in number and include an idle position and eight throttle speed positions. The throttle handle is also used to control the magnitude of dynamic braking. During dynamic braking, however, no indexing is felt and there is only a slight resistance to handle movement. The throttle handle of the present invention is also provided with an emergency stop position which is simple and convenient for the operator to reach when he is controlling the throttle handle. This emergency stop position cuts off the engine fuel supply as a safety precaution in case of an accident or some other emergency.

A third handle may be included as a basic part of a controller. This handle is known as the selector handle or transition lever. This handle should preferably be provided with:

(*a*) A plurality of positions for selecting the transmission circuit which best suits the locomotive load requirements. This generally requires four positions, the first of which connects the traction motors in series parallel across the main generator, and the second of which connects the motors in series parallel across the main generator with the traction motor fields partially shunted. The third position connects the motors in parallel across the main generator, and the fourth position is provided to connect the motors in parallel across the main generator and also partially shunt the traction motor fields. These four positions are usually labeled 1, 2, 3 and 4, respectively.

(*b*) An "off" position. The "off" position should provide for disconnecting the electrical supply voltage from all control equipment. This "off" position also prevents the operator from going directly from a power position to a dynamic braking position so as to provide switch gear protection.

(*c*) A brake or "B" position which connects the traction motor armatures across suitable resistor grids to thereby provide dynamic brakes. The selector handle must be constructed so that none of the positions may be by-passed; i. e., to go from transition position 4 to "B," the operator must first go through positions 3, 2, 1 and "off" in that order. The operator, however, can go from any given setting to any adjoining setting of the handle; for example, he can select transition position 2 from either position 1 or position 3, or he can select "off" position from either "B" position or transition position 1. In addition to limiting movement from position to position, it is preferable to provide the selector handle with means necessitating a certain time delay between steps in order to allow for complete switch gear operation which might otherwise cause severe damage to the electrical switches due to arcing, short circuiting, etc.

(*d*) An automatic transition position to replace the manual transition provided when automatic transition is desired. It should be possible to eliminate the "B" position when no dynamic brakes are supplied on the locomotive and no dynamic braking or "B" position is required.

The present invention has means to mechanically interlock the three handles previously described so as to meet the following conditions, all of which prevent the operator from inadvertently moving a handle to a position which might seriously damage and perhaps render inoperative certain parts of the locomotive.

1. Locking the directional handle so that it cannot be moved from forward to reverse or reverse to forward with the throttle handle above the No. 1 engine speed position.

2. Limiting movement of the selector handle so that it cannot be returned to its "off" position when the throttle handle is advanced beyond its idle position.

3. Limiting movement of the throttle handle so that it cannot be advanced beyond its idle position with the selector handle in the "off" position.

4. Interlocking the directional handle so that it cannot be moved from either its forward or reverse position when the selector handle is in transition positions 2, 3 or 4, and the throttle handle is advanced beyond the idle position.

5. Interlocking the directional handle so that it cannot be moved to either the forward or reverse positions when the selector handle is in its braking position.

6. Interlocking the selector handle so that it cannot be moved from the braking position until the throttle handle when operating as a dynamic brake control is brought back to the zero brake position.

7. Limiting movement of the selector handle to either its "off" or No. 1 position when the directional handle is in the neutral position.

8. Allowing the directional handle to be moved to any of its positions when the selector handle is in either its "off" or No. 1 transition position, but only when in these two positions.

9. Allowing the throttle handle to be moved to the emergency stop position regardless of the position of either the selector or directional handle.

10. Allowing selector handle or any parts of its associated mechanism to be omitted without effecting the prescribed interlocking between the throttle and directional handles.

It should be emphasized that so far as is known, no controller has been heretofore developed which will achieve all or even most of the functions outlined above. It has been determined, however, that a controller with handles judicially placed which will achieve such results will provide the optimum of ease of operation for the operator and will better enable him to watch signals, observe road conditions and carry out other duties in addition to controlling the train smoothly in both power and braking.

From the above, it may be appreciated that the controller is the preordinated nerve center of the locomotive and as such is the most important factor in the proper performance and handling of the locomotive. Its quality, durability, reliability and ability to carry out the functions outlined above will influence to a substantial degree the handling of an entire train and will aid in the prevention of accidents and the proper transportation of passengers and goods.

It is, therefore, an object of this invention to provide a locomotive controller having three main manually operated portions which are interlocked to prevent improper operation of one portion relative to the other two.

It is a further object of this invention to provide a locomotive controller having three main manually operated portions including a directional control, a throttle control and a transition control which are interlocked so as to prevent improper operation of the controls relative to each other.

It is a further object of this invention to provide a controller having three manually operated handles provided with means for operating a plurality of switches in different combinations to control locomotive operation; the handles being provided with positive mechanical means in which no springs are used, to interlock the handles in various operating positions so as to prevent improper operation of one or more handles relative to the other handles which might otherwise cause damage to the switch gear and other portions of the locomotive.

It is another object of this invention to provide a controller having a plurality of manually operated handles and an interlocking mechanism therefor of dimensions small enough to permit the construction of a complete engineer's control console in the limited space provided in a locomotive cab. This console to include all necessary air control equipment such as air brake valves and piping, and a centralized electrical terminal board to be arranged immediately below the controller assembly, said mechanism to additionally allow the mounting of all hand-operated control switches as well as the pilot and signal lamps and air gauges and other indicating means above said mechanism.

It is a further object of this invention to provide a locomotive controller having a controller locking device and a plurality of manually operable handles including a directional handle removable in a neutral position to actuate said controller locking device and lock the controller so that it cannot be operated.

For further and other objects of this invention, reference may be had to the accompanying detailed description and drawings in which:

Fig. 1 is a front view in elevation of the exterior of the new controller assembly showing the gauges at the top thereof, locomotive light and other switch and switch rheostats immediately below, and the three operating handles in vertical staggered relationship, with the selector handle being shown in its "off" position, the throttle handle in its "idle" position and the directional handle in its "neutral" position.

Fig. 2 is a front view in elevation of the operating mechanism of the controller with the housing removed. Fig. 2 at the bottom thereof shows the location of the dynamic braking rheostat immediately below the interlocking mechanism which prevents improper operation of the three operating handles on the part of the locomotive engineer. Fig. 2 also illustrates how these operating handles control switch drums having cams thereon engageable with the operating mechanisms of banks or stacks of switches.

Fig. 3 is a side view in elevation of the operating mechanism of the controller showing the selector handle at the top, the directional handle at the bottom and the throttle handle interposed between the first two mentioned handles. Fig. 3 also more clearly illustrates the stacks of switches which are actuated in various combinations by rotation of the cam drums attached to the aforementioned handles.

Figure 7:
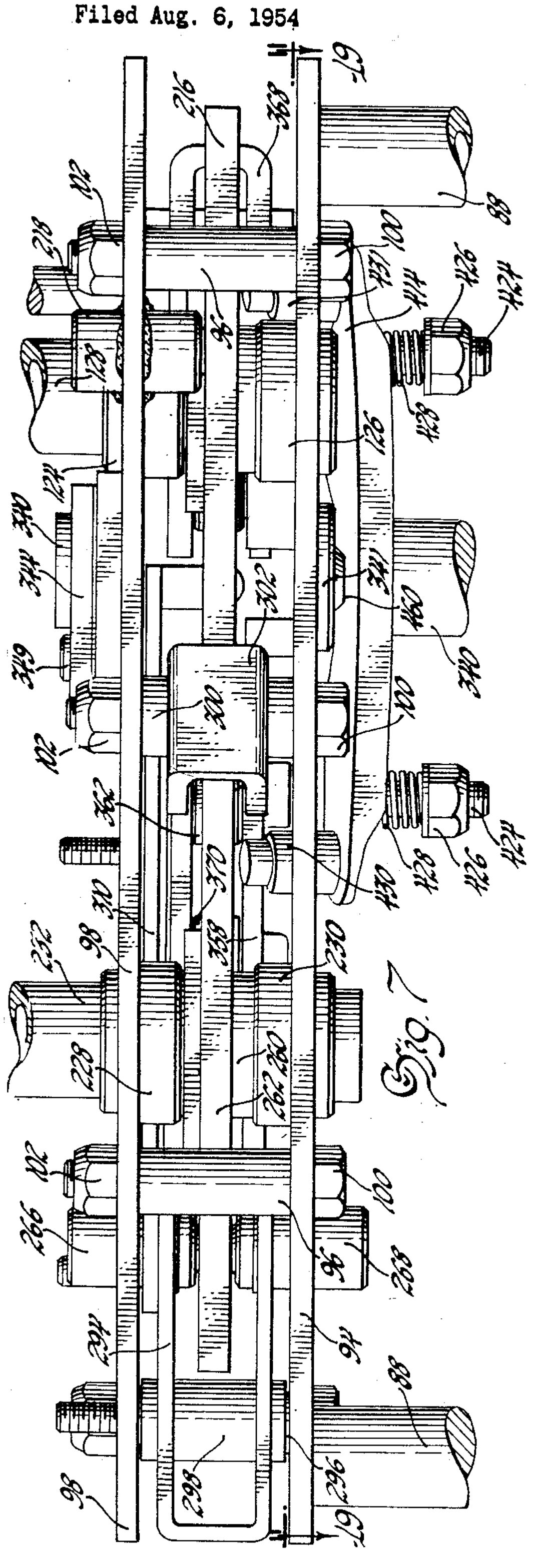

Fig. 7 is an enlarged front view in elevation with parts removed of the interlocking mechanism which interlocks the three operating handles in various combinations to prevent improper movement of one or more of these handles relative to each other. Fig. 7 also shows in part an additional locking mechanism located below the interlocking mechanism which is operated when the directional handle is removed from the controller to lock the controller mechanism so that it cannot be operated by unauthorized personnel.

Figure 8:
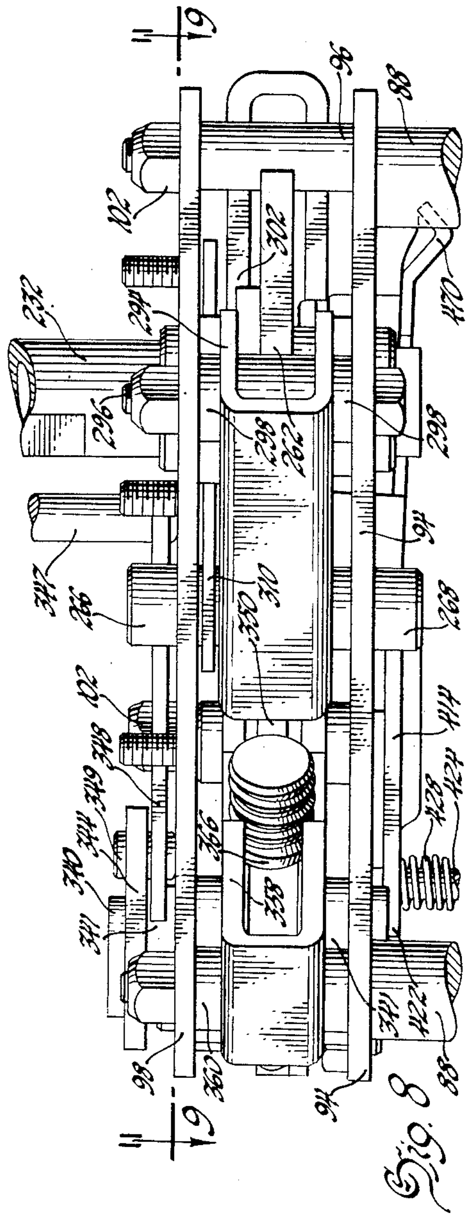

Fig. 8 is an enlarged side view of the interlocking mechanism.

Figure 9:
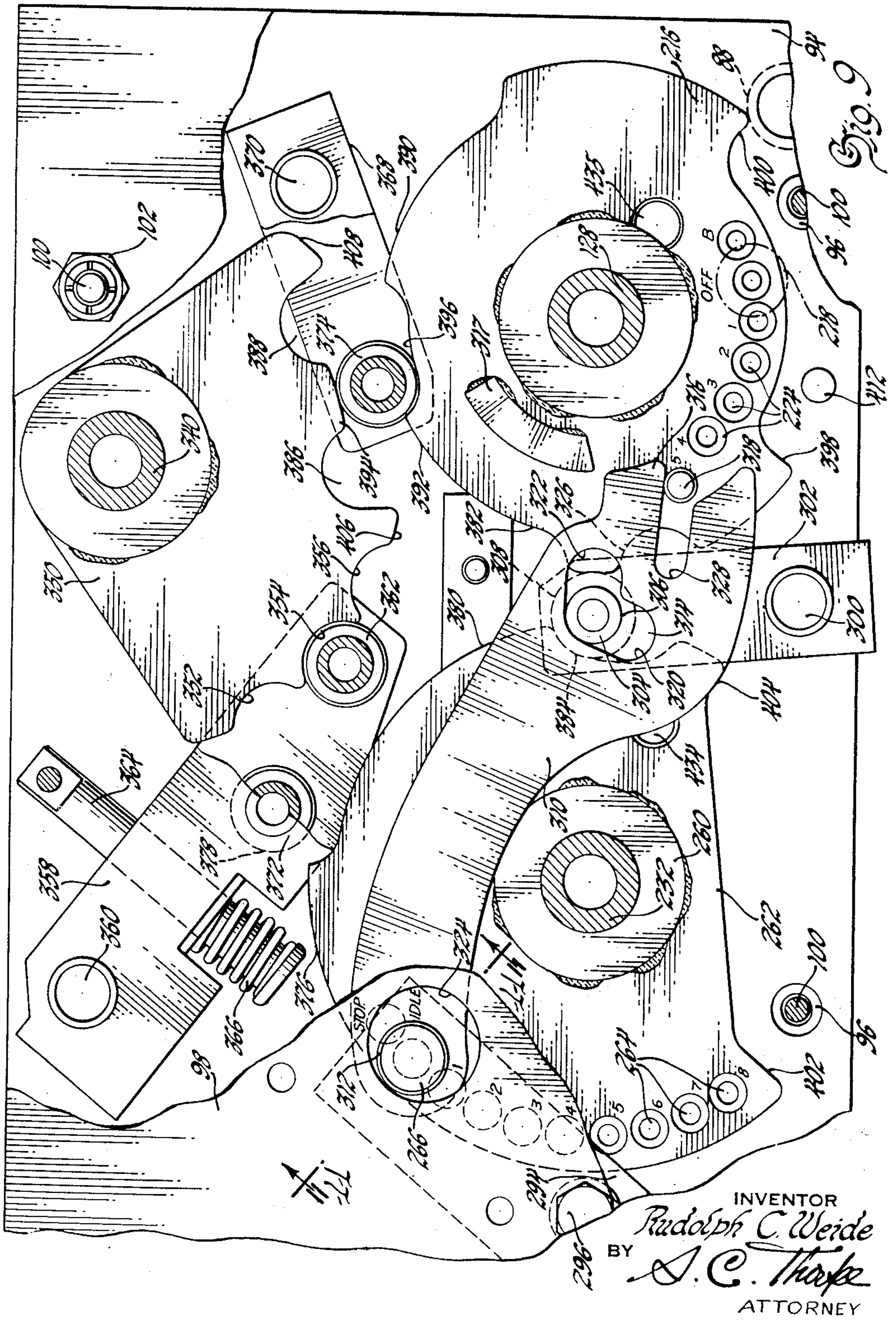

Fig. 9 is a top view of the interlocking mechanism taken on the line 9—9 of Fig. 8 with parts broken away to indicate how the operating handles are interlocked against improper operation.

Figure 2:
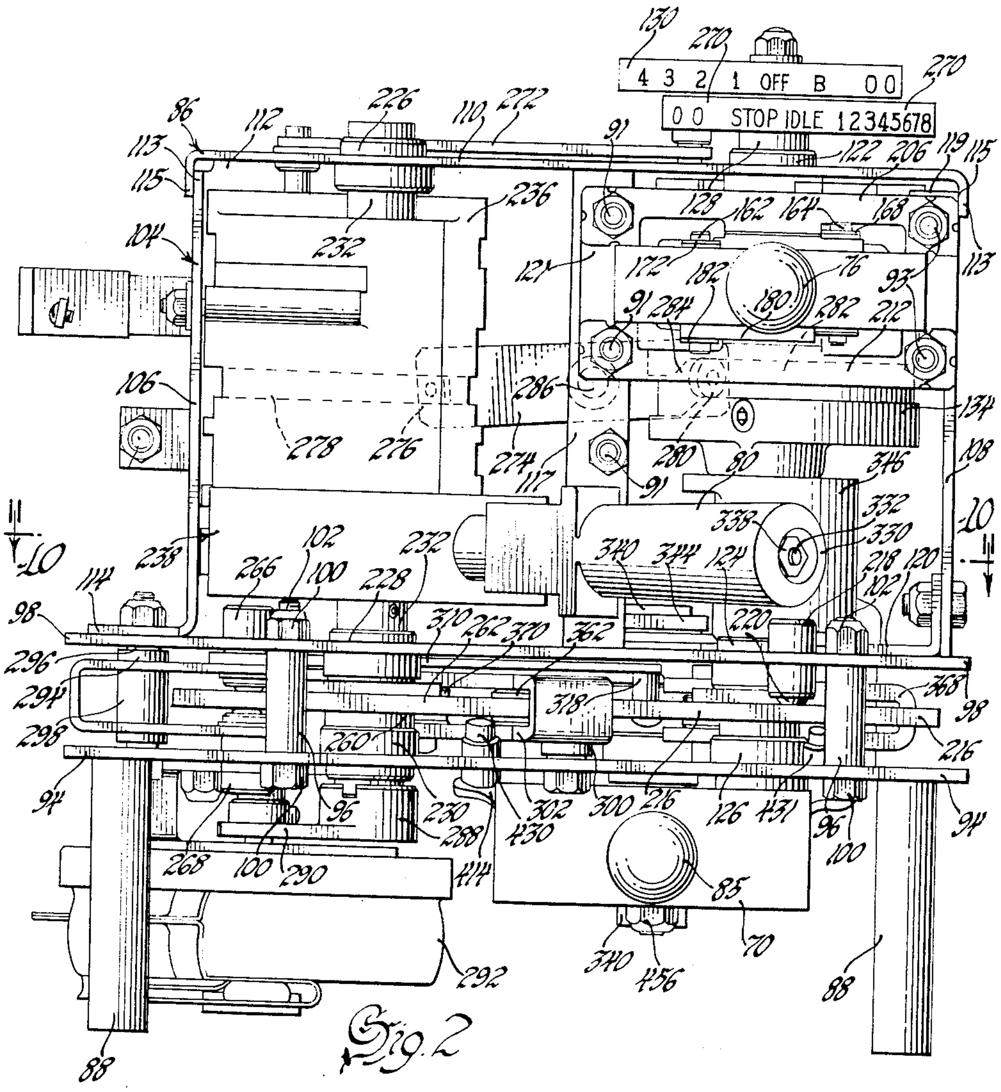
Figures 10, 11:
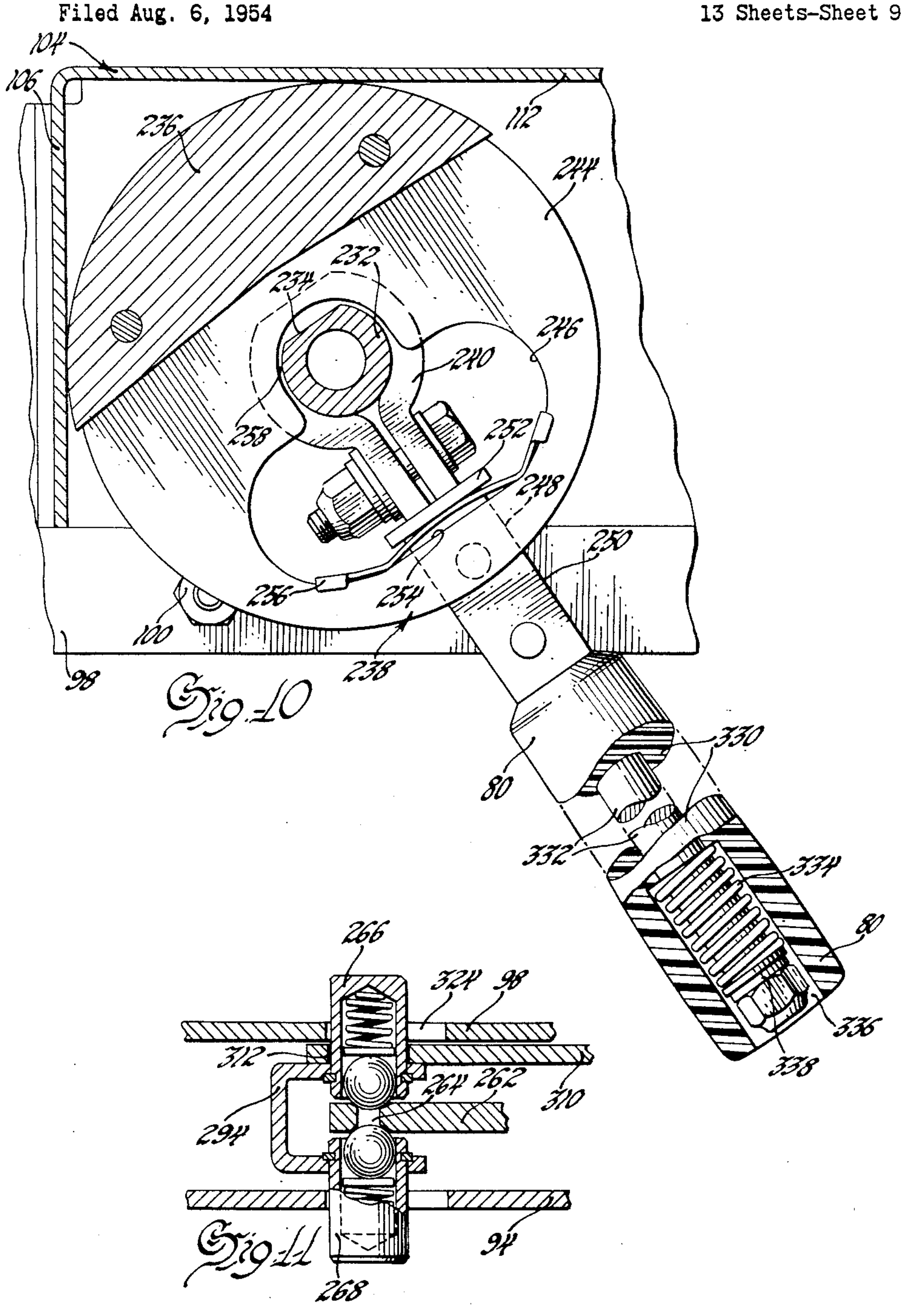

Fig. 10 is a view taken on line 10—10 of Fig. 2 and serves to illustrate details of the throttle handle.

Fig. 11 is a view in section taken on line 11—11 of Fig. 9 and shows the details of construction of the detent means which index the various throttle positions.

Figures 12, 13, 14:
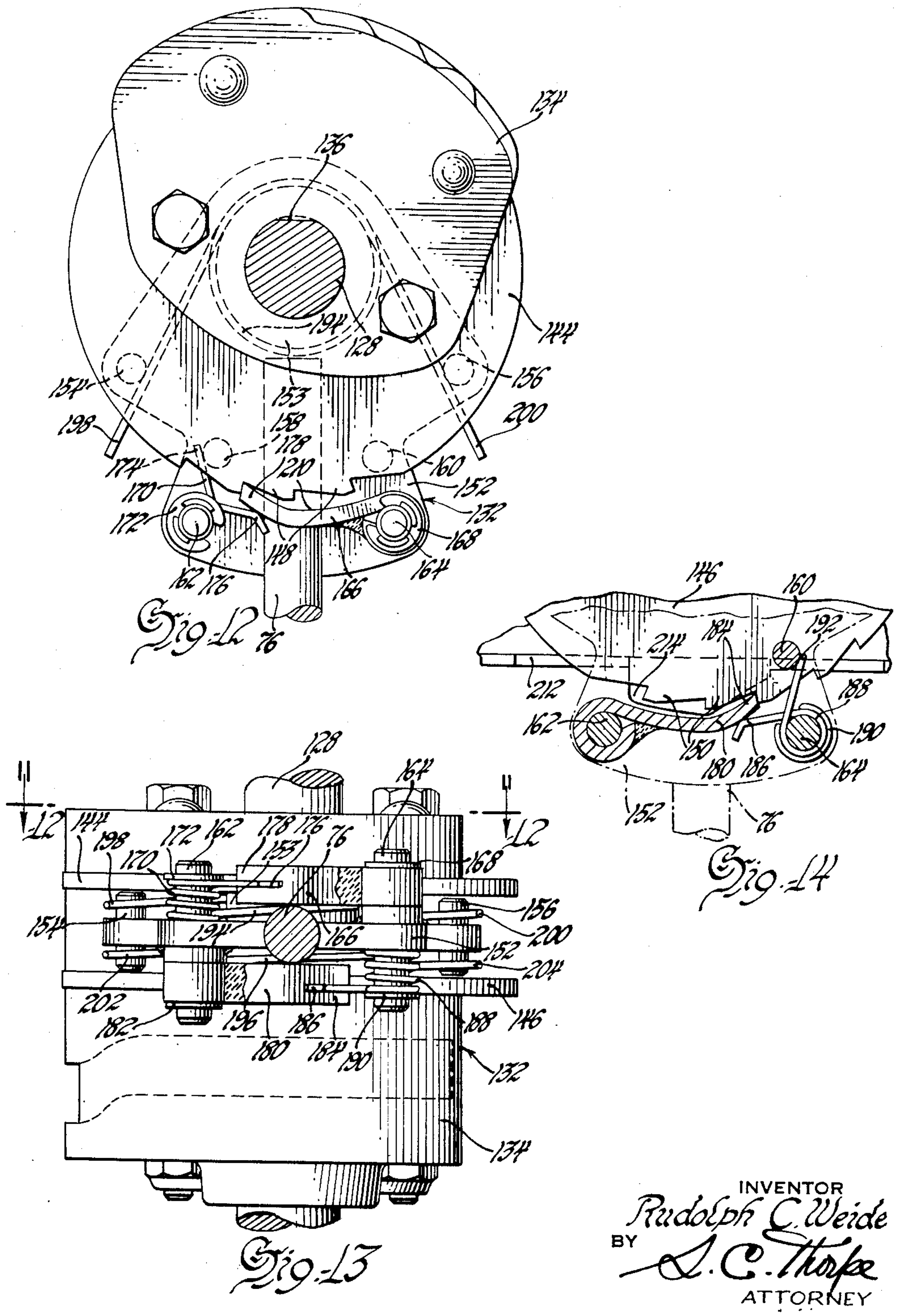

Fig. 12 is a view taken on the line 12—12 of Fig. 13 and illustrates certain details of construction of the selector handle mechanism.

Fig. 13 is a front view of the selector handle mechanism including the cam drum which it operates and the means which allow it to be moved from its normally centered or "home" position to the left or right to move the cam drum one position at a time.

Figure 5:
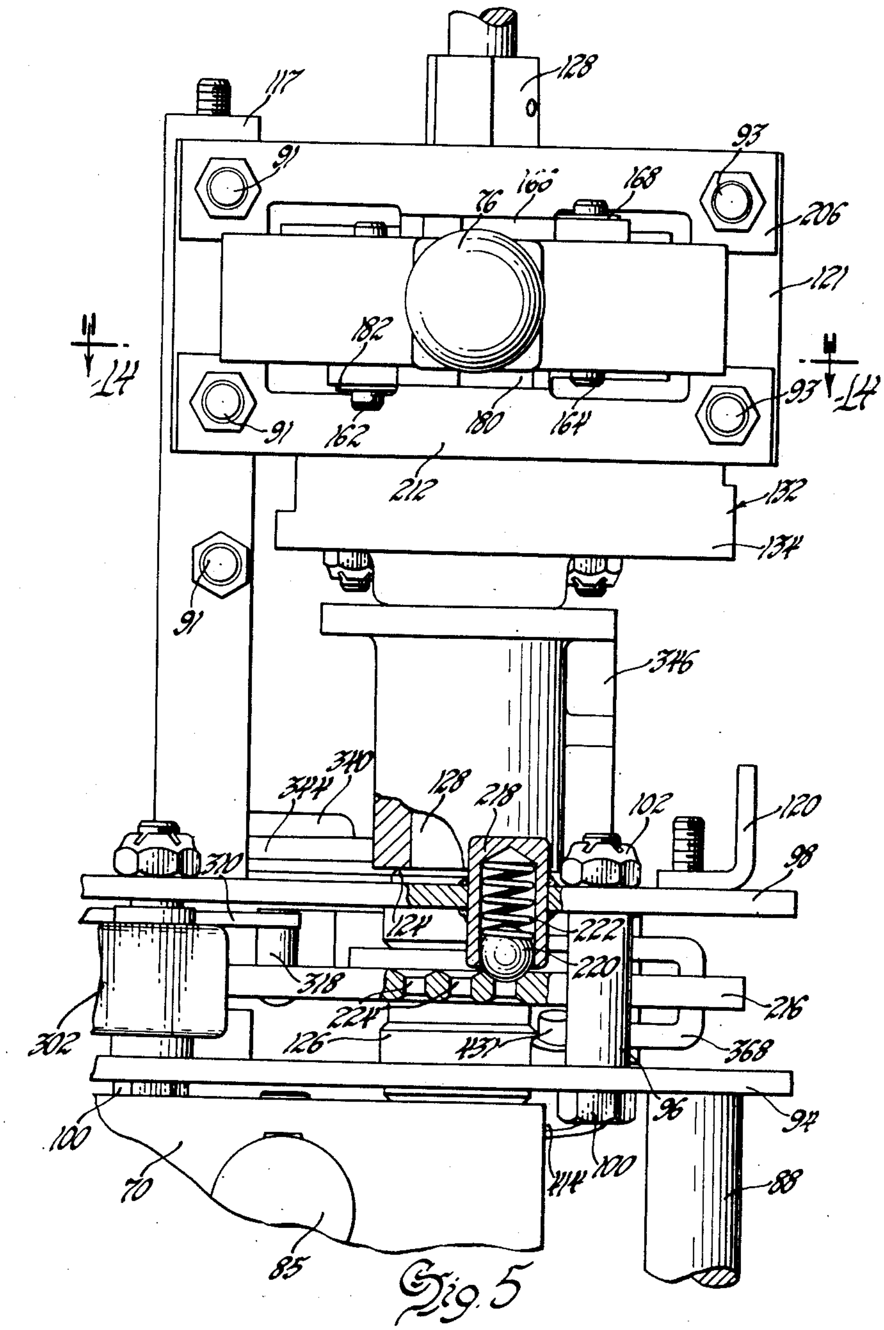
Fig. 5 is an enlarged front view in elevation of the controller with the housing and switch chassis removed to illustrate the selector operating mechanism of the controller. Parts have been broken away and shown in section in Fig. 5 to illustrate details of the detent means for indexing the selector positions.
Figure 6:
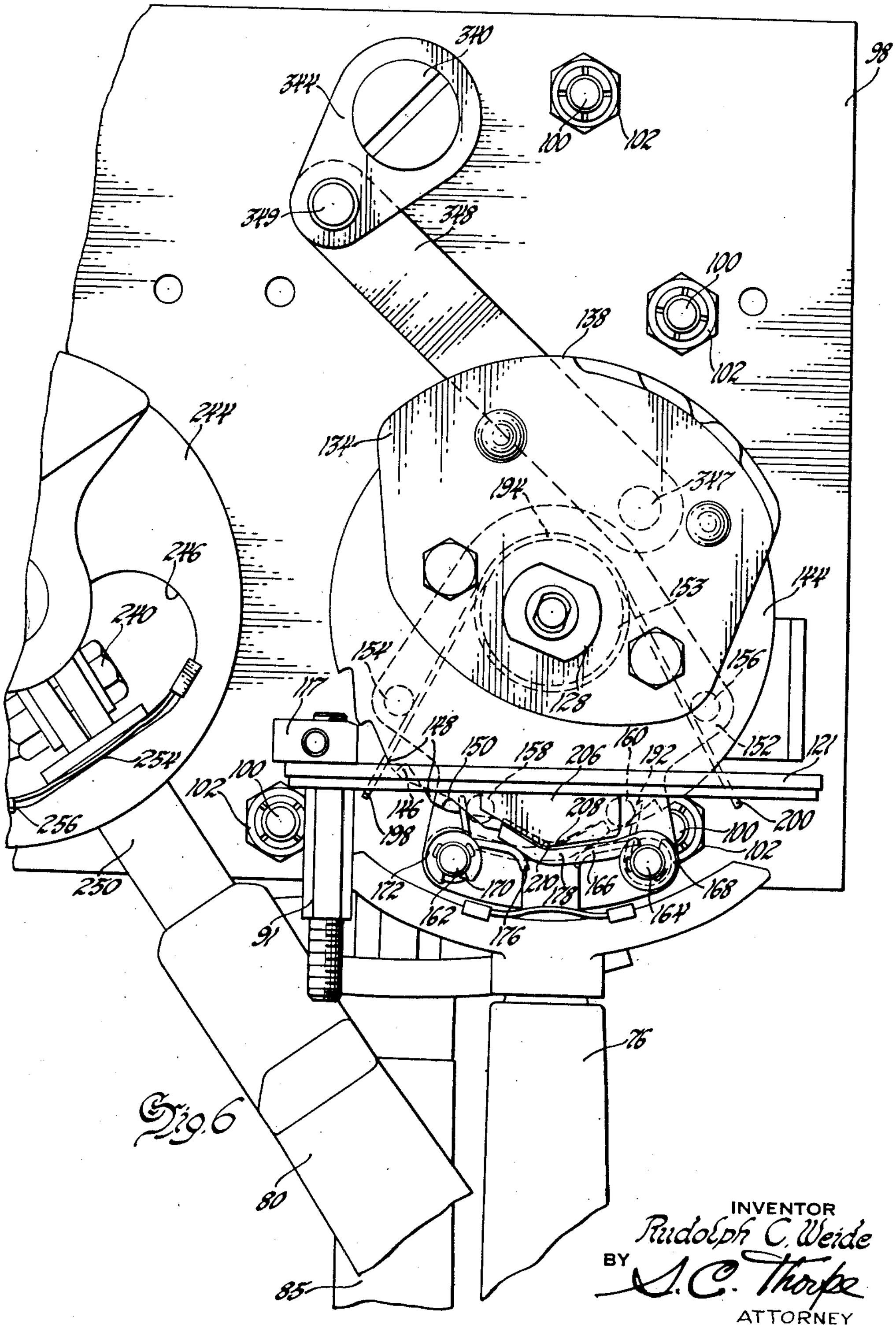
Fig. 6 is a top view of the controller with the controller housing and the switch chassis removed to further illustrate the selector operating mechanism of the controller including the trip latches and pawls which enable the selector mechanism to be "pumped" one position at a time in either direction from the centered or "home" position of the selector handle.

Fig. 14 is a view in section taken on the line 14—14 of Fig. 5 with parts attached to the switch chassis added to illustrate how the pawls are held in engagement with the teeth on the operating plates of the selector handle mechanism and also cammed away from the teeth by the trip latches when the selector handle is moved from its centered or "home" position.

Figure 15:
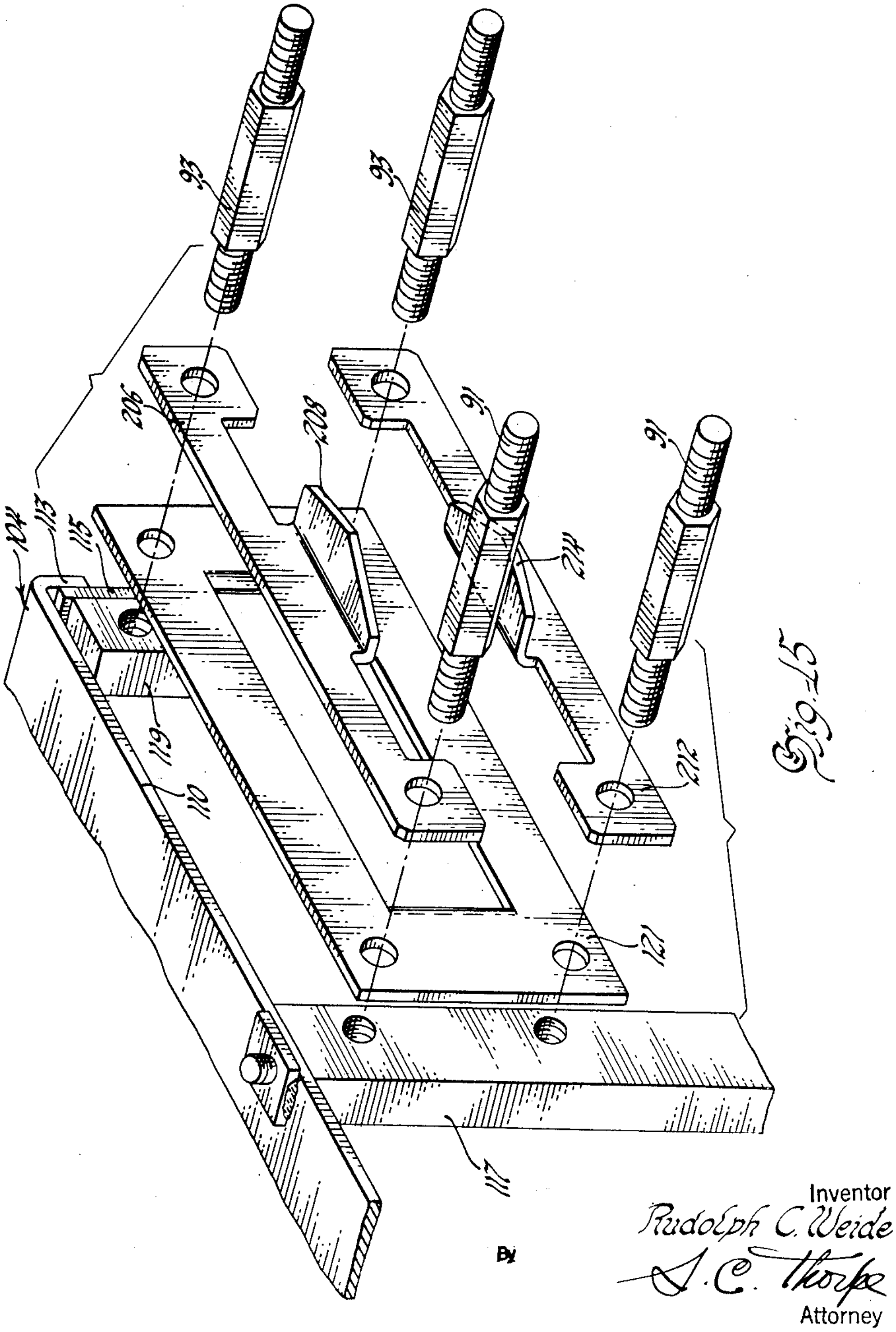

Fig. 15 is an exploded view in perspective of a portion of the switch chassis, the selector handle guide and the two trip latches, showing their configurations and how they are assembled.

Figure 16:
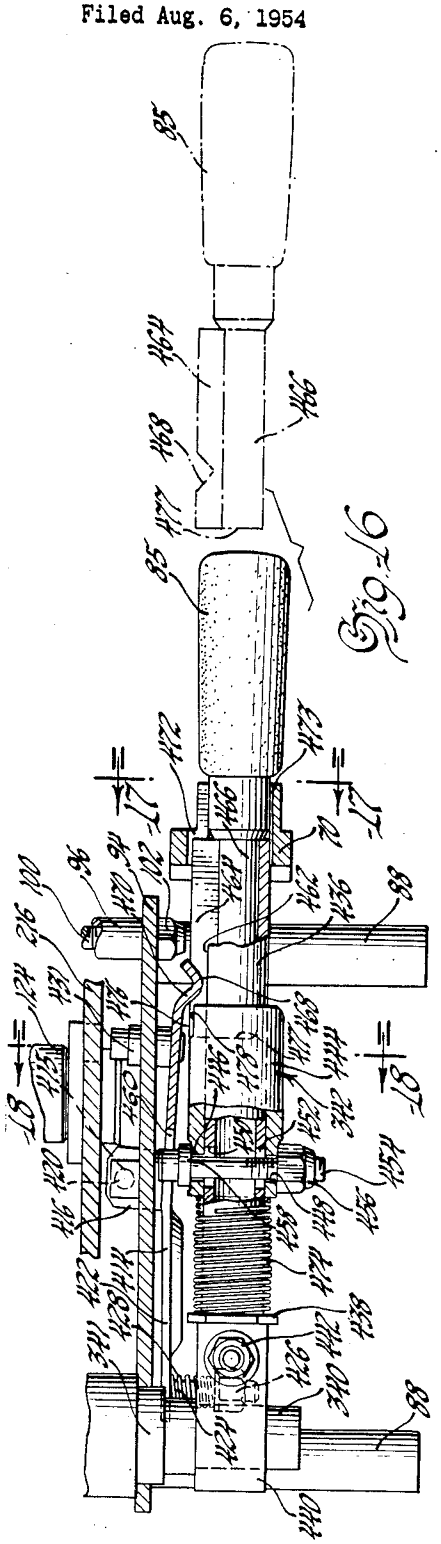

Fig. 16 is a side view in elevation of the lower portion of the controller mechanism with parts removed and in section and shows the removable directional handle and the locking means for locking the controller against operation by unauthorized personnel when the handle has been removed.

Figure 17:
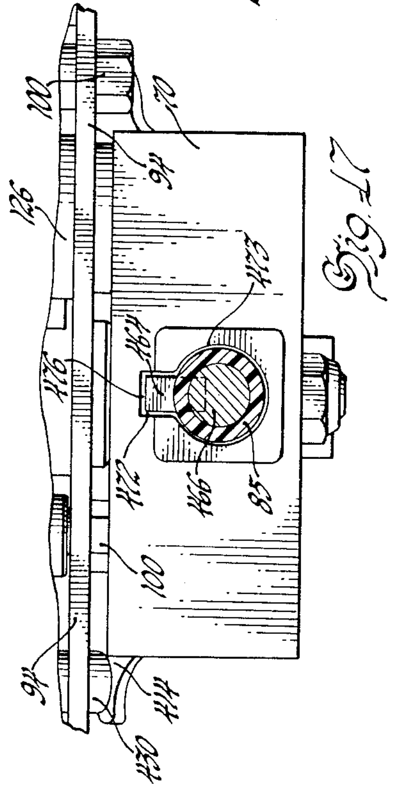

Fig. 17 is a view in elevation taken on the line 17—17 of Fig. 16 and further illustrates details of construction of the controller locking mechanism.

Figure 18:
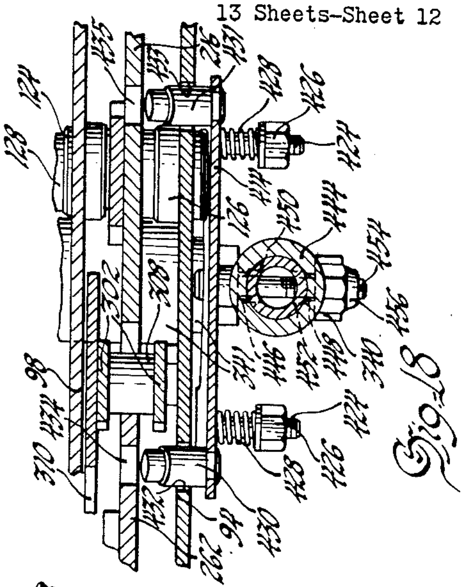

Fig. 18 is a section in elevation on line 18—18 of Fig. 16 illustrating how the pins in the controller locking plate may engage in holes in the selector and throttle interlocking plates when the directional handle is removed.

Figure 19:
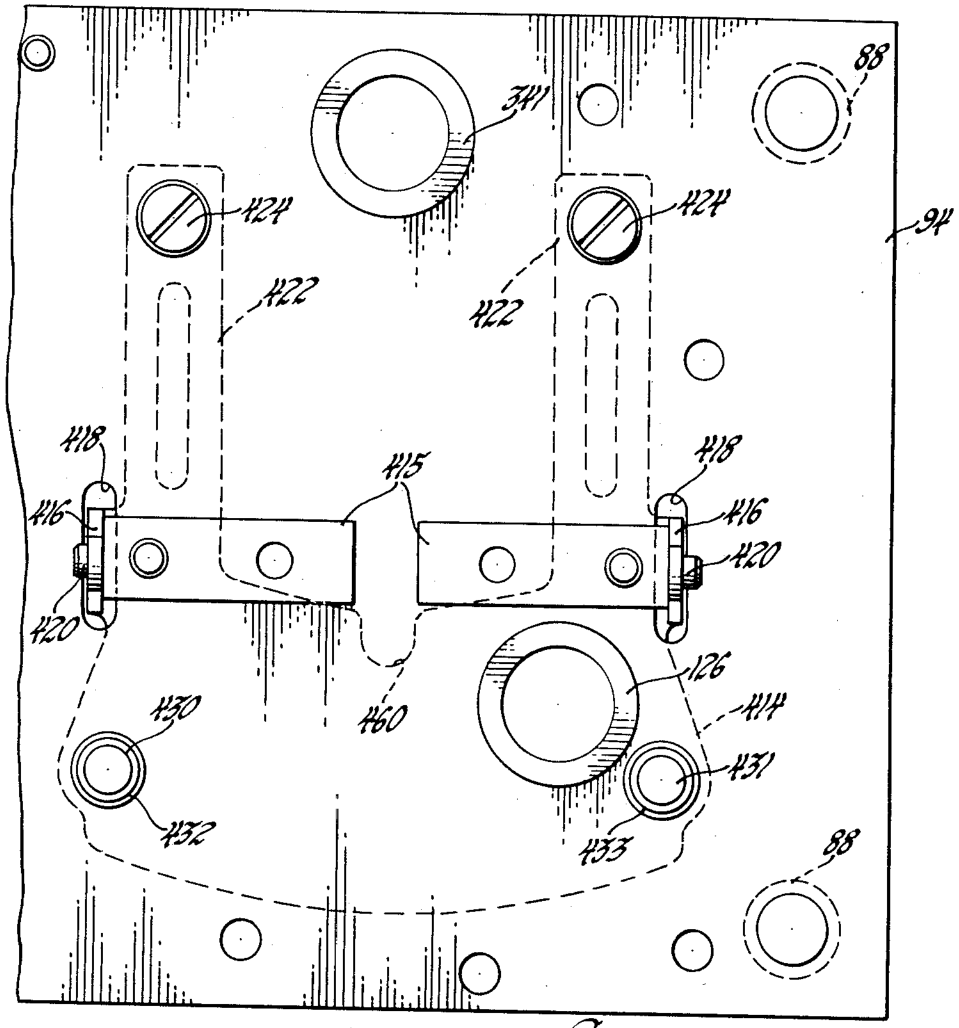

Fig. 19 is a top view in section with parts removed taken on line 19—19 of Fig. 7 to illustrate how the controller locking plate is pivotally secured to the lower plate enclosing the interlocking mechanism.

Figure 20:
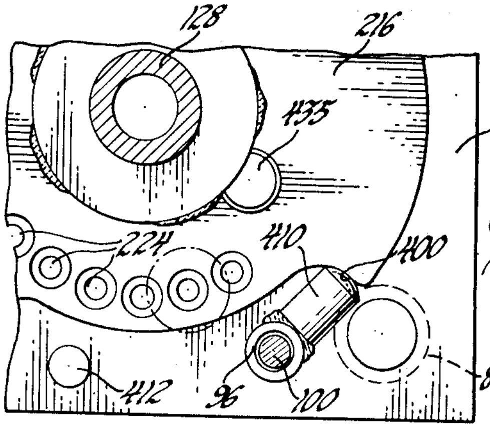

Fig. 20 illustrates how the selector assembly may be modified to render inoperative its dynamic braking position.

Figure 1:
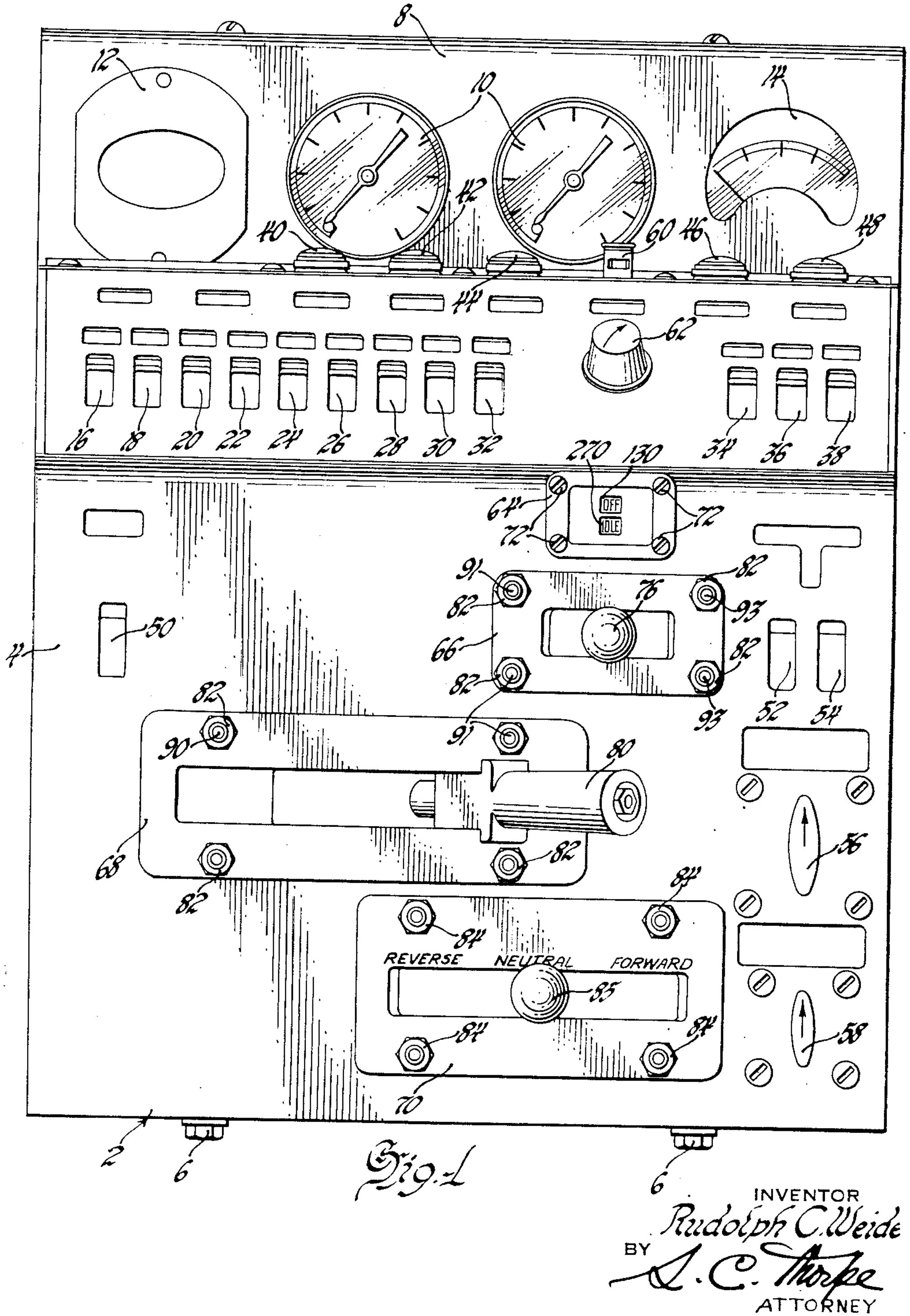

Referring now to Fig. 1, the entire controller assembly is shown and is generally indicated by a reference numeral 2. The controller assembly 2 includes a housing 4 which is provided with holes in the underside thereof for the reception of studs 6. The studs 6 are provided for the purpose of securing the controller mechanism (to be described later) in the housing 4. It will be noted that the controller assembly 2 is provided in its upper portion 8 with a plurality of gauges 10 and other indicators 12 and 14, respectively. This upper portion 8 may be removed without disturbing the remainder of the controller housing 4. The controller is provided with a plurality of switches 16, 18, 20, 22, 24, 26, 28, 30, 32, 34, 36, 38 which control various lights and lighting systems in the locomotive. Several warning lights 40, 42, 44, 46, 48 are provided on the controller to indicate such things as a hot engine, the occurrence of wheel slip, etc. Examples of other switches contained in the controller assembly are the engine room and hood light switch 50, the rear and front headlight switches 52 and 54, respectively, the headlight brightness rheostat 56 and the cab heater switch 58. An order light 60 and order light rheostat 62 are also provided in the controller.

On the outside of the controller housing are four escutcheon plates 64, 66, 68, and 70. Escutcheon plate 64 is secured to the front of housing 4 by suitable fastening means 72 and acts to frame the selector handle indicator 130 which indicates the position of selector handle 76. The escutcheon 64 also frames the indicator means 270 which indicates the position of the throttle handle 80. The escutcheons 66 and 68 which locate and define the movement of the selector handle 76 and throttle handle 80, respectively, are made of relatively heavy gauge metal and are also secured to the housing 4 by suitable nuts 82 in a manner to be later described more particularly. Similarly, escutcheon 70 is secured to the housing 4 by nuts 84 and surrounds and defines the movement of directional handle 85.

Figure 3:
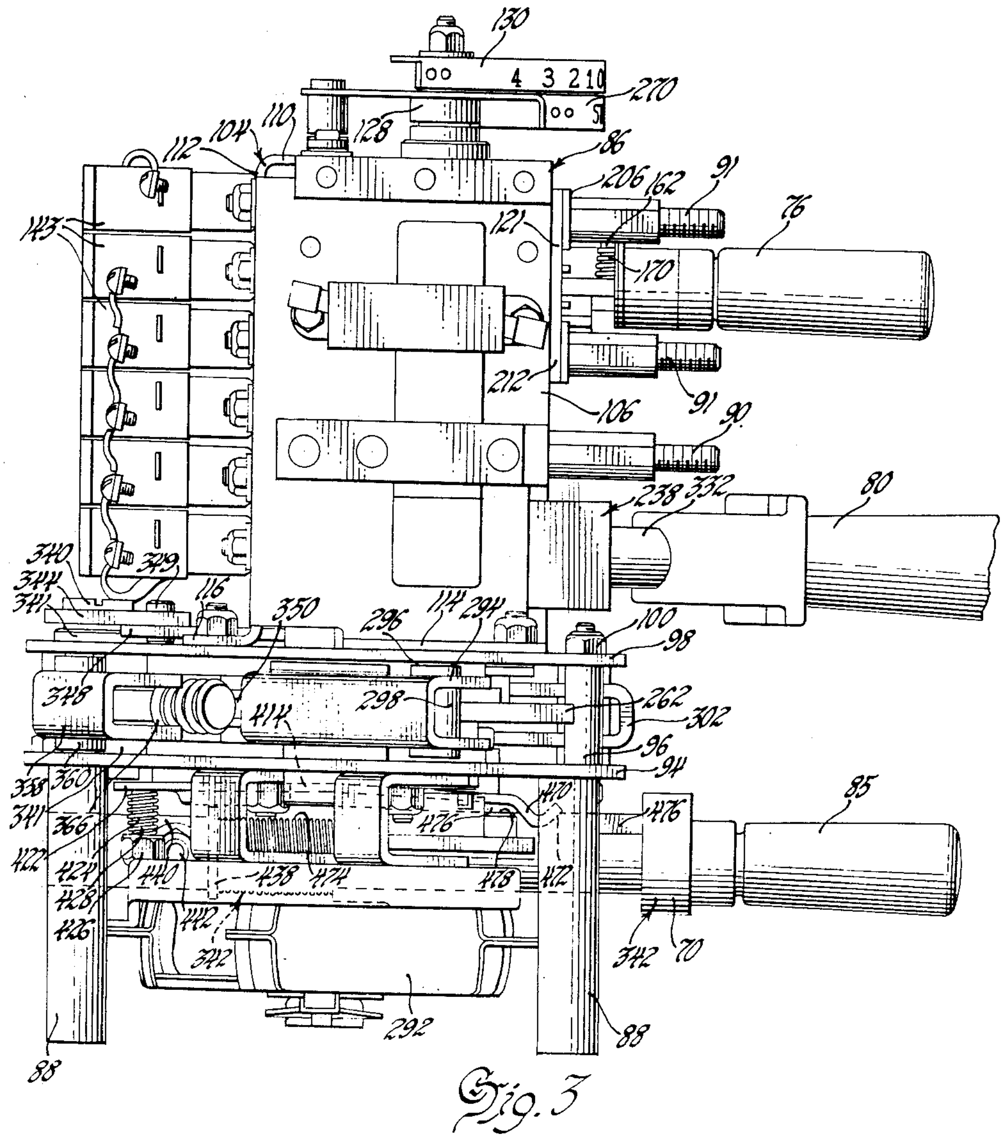
Figure 4:
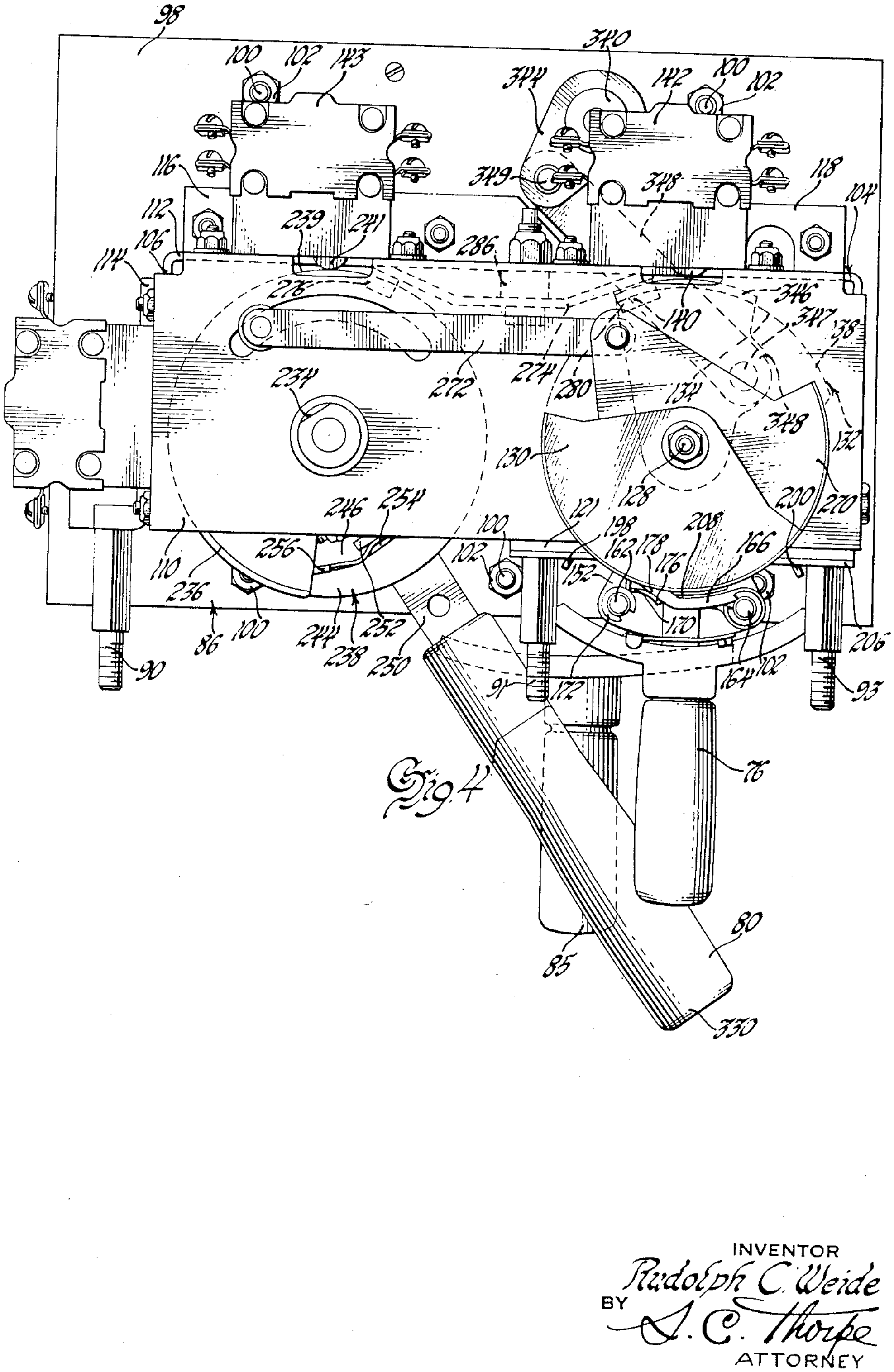
Fig. 4 is a top view of the controller with its housing removed, and in addition to further illustrating the operating mechanism of the controller illustrates the location of the switches and how they are actuated by the cam drums attached to the manually operated handles.

Referring now to Figures 2, 3 and 4, the controller mechanism, indicated generally by the numeral 86, which forms the main part of the controller is shown. This controller mechanism 86 is assembled in and removed as a unit from the controller housing 4. When assembled in the housing 4, the controller mechanism 86 is normally secured by the studs 6 extending through the underside of the housing 4 and engaging threads tapped in the ends of the legs 88. The controller mechanism 86 is additionally secured to the housing 4 by means of studs 90, 91 and 93 thereon which extend through holes in the front of the housing when the control mechanism is properly located therein. The studs 91, 93 also locate the escutcheons 66 and 68 since these studs also pass through suitable holes provided therein. The controller mechanism 86, the escutcheons 66 and 68 and the housing 4 then are all secured together by means of the studs 90, 91, 93 and nuts 82. By securing the escutcheons, the controller mechanism and the housing in this manner, a reliable support is provided between the handles and the housing. This also assures that the escutcheons will be properly supported which is important since they are the parts which have to take the impact from the handles when slammed thereagainst.

The controller mechanism 86 comprises a frame assembly including four legs 88 which are secured to a lower plate 94. Supported on the lower plate 94 by means of a plurality of spacers 96 is an upper plate 98. The plates 94 and 98 are rigidly secured together by means of bolts 100 extending through the spacers 96, the bolts 100 being provided with the usual nuts 102. Supported on the upper plate 98 is a switch chassis 104 of box-like construction formed from a single plate. The switch chassis 104 is formed so that it has two side walls 106 and 108, respectively, a top wall 110 and a back wall 112. The top wall 110 is bent forward and secured to the side walls 106, 108 along the edges 113, 115. The switch chassis 104 has suitable flanges 114, 116, 118 and 120 which are bolted to the top plate 98. Secured to the top wall 110 adjacent the edge thereof and to the plate 98 is a post 117. Secured to the switch chassis wall 108 is a tapped block 119. The post 117 and tapped block 119 are provided with threaded holes into which the upper two of the studs 91 and the studs 93 may be screwed to secure a cover plate 121 and upper and lower trip latches 206 and 212, respectively, thereto (see Fig. 15). The purposes of cover plate 121 and trip latches 206, 212 will become more apparent later in the specification.

Referring now to Figures 5 and 6, and 12 through 15, in addtion to Figures 2, 3 and 4, the selector mechanism, which forms a part of the controller mechanism 86, will be described. Mounted in the top wall 110, the upper plate 98 and the lower plate 94 in alignment with each other are three bushings 122, 124 and 126, respectively. These bushings act as bearing supports for a selector shaft 128. Mounted on the selector shaft 128 and adapted to rotate therewith is an indicator 130. The indicator 130 is provided with six positions—an "off" position, a braking position B, and four transition positions numbered 1, 2, 3, and 4. Also mounted on the selector shaft 128 is a selector assembly indicated generally by the numeral 132. This selector assembly 132 includes a selector cam drum 134 which is keyed to the shaft 128 for rotation therewith by flat portions 136. The selector cam drum 134 is provided with operating surfaces 138 (see particularly Figs. 4 and 6) which engage the switch actuating rollers 140 of a plurality of switches 142 mounted in a stack on the back wall 112 of the switch chassis 104. Rigidly secured to the selector cam drum 134 and dividing it into two sections are a pair of plates 144 and 146, respectively (see particularly Figs. 12, 13, and 14). Plate 144 is provided with a plurality of teeth 148 along the front edge thereof facing in one direction. Plate 146 is also provided with a plurality of teeth 150 facing in a direction opposite to teeth 148. Interposed between the plates 144 and 146 is a plate 152 fixed about a bushing 153, which is adapted to freely turn on the shaft 128 without turning the shaft. Plate 152 has extending therethrough and secured therein six pins 154, 156, 158, 160, 162 and 164. Also rigidly secured to the plate 152 so that it may turn the plate 152 and bushing 153 on the shaft 128 is the selector handle 76. In order to transmit the rotational movement imparted to the plate 152 to the cam drum 134 when the selector handle 76 is moved to the left or clockwise, a pawl 166 is pivotally attached to the pin 164 on the upper side of plate 152. The pawl 166 is anchored on the pin 164 by means of a retaining washer 168 engaging a groove in the upper end of pin 164. The free end 178 of pawl 166 is held in engagement with the teeth 148 by means of a small torsion spring 170 wrapped about and secured on the upper portion of pin 162 by means of a washer 172 engaging a groove in the upper portion of pin 162. It will be noted that one end 174 of torsion spring 170 abuts the upper portion of pin 158 secured to plate 152 and the other end 176 of torsion spring 170 abuts the free end 178 of pawl 166 and, as already mentioned, holds it in engagement with the teeth 148. A similar pawl 180 for transmitting counterclockwise movement of plate 152 to shaft 128 is pivotally secured to the lower portion of pin 162 in plate 152 by means of a retaining washer 182 engaging a groove in the lower portion of pin 162. The free end 184 of pawl 180 is held in engagement with the teeth 150 by an end 186 of a torsion spring 188 wrapped about the lower portion of pin 164 and anchored thereto by means of a small retaining washer 190 engaging a groove therein. The other end 192 of spring 188 abuts the pin 160 in plate 152. Upper and lower torsional springs 194 and 196, respectively on either side of plate 152, are wrapped about the bushing 153. The portions adjacent the ends 198 and 200 of spring 194 abut the upper ends of pins 154 and 156, respectively, each secured in plate 152. The ends 198 and 200 abut the inside edges of cover plate 121 (best seen in Figs. 4 and 6). The portions adjacent the ends 202 and 204 of spring 196 abut the lower ends of pins 154 and 156 and the ends 202 and 204 abut the inside edges of cover plate 121. It will be noted particularly in Figures 6 and 15 that an upper trip latch 206 is rigidly secured to the switch chassis 104. The upper trip latch 206 is provided with a cam surface 208 which engages an inner surface 210 on the end 178 of pawl 166. The surface 208 cams the end 178 away from one of the teeth 148 as the selector handle and consequently the plate 152 are turned in a counterclockwise direction as far as they will go (until the handle 76 abuts the right inner edge of escutcheon 66). When the handle 76 is released the pawl will then slide back over the surface 208 when the torsion springs 194 and 196 return the plate 152 to its centered position and the pawl 166 will engage the tooth to the left of the one which it originally engaged. Referring especially to Figs. 14 and 15, a similar trip latch 212 is located below the plate 152 and, as previously mentioned, is also rigidly secured to the switch chassis 104. The trip latch 212 is also provided with a cam surface 214 which cams the pawl 180 out of engagement with a tooth when the selector handle and plate 152 are turned about the shaft 128 in a clockwise direction as far as they will go. This allows the end 184 of pawl 180 to slide into engagement with the tooth immediately to the right of the tooth in which it was originally engaged when the plate 152 is returned to its center position by means of the torsion springs 194 and 196.

Before describing the operation of the selector handle and selector assembly it should be observed from Figs. 2, 5, 7 and 9 that at the lower end of shaft 128 and between the bushings 124 and 126 is the selector interlocking plate 216. The selector interlocking plate 216 is rigidly secured to the shaft 128 for rotation therewith. As is observed in Fig. 5, there is rigidly mounted in the upper plate 98 a spring detent housing 218 enclosing a ball detent 220 which is loaded by a helical spring 222. The ball detent 220 alternately engages a plurality of holes 224 in the selector interlocking plate 216. The holes 224 correspond to the plurality of positions indicated on the selector indicator 130. In other words, in Fig. 9 the hole furthest to the right in interlocking plate 216 corresponds to "B," the hole immediately to the left of the hole furthest to the right corresponds to the "off" position, etc. These positions have been indicated on the selector interlocking plate 216 to aid in describing applicant's invention.

The operation of the selector handle and the selector assembly is as follows: Let it be assumed that the selector handle is in the "off" position and it is desired to select the No. 1 transition position. The handle 76 is normally centered or held in its "home" position by the torsion springs 194, 196, abutting pins 154, 156 and the inside edges of cover plate 121. In other words, the selector handle 76 extends perpendicularly outward from the controller housing. From the centered or "home" position the handle 76 may be moved either to the left or to the right against the action of springs 194, 196. Movement of the handle 76 to the right (in a counterclockwise direction) causes the plate 152 to rotate about the shaft 128, also in a counterclockwise direction. Since the end 184 of pawl 180 is in engagement with one of the teeth 150, the plate 146 will also be turned in a counterclockwise direction. Rotation of the plate 146 in a counterclockwise direction will also rotate plate 144 and the cam drum 134 in a counterclockwise direction. Movement of the handle 76 to the right (counterclockwise), however, is limited by the selector escutcheon 66 so that no further clockwise movement of the plates 144 and 146 and the cam roller drum 134 is immediately possible. In order to turn the plates 144, 146 and the cam drum 134 further to the right (counterclockwise) the selector handle 76 must be returned to its centered or "home" position (preferably by releasing it and letting it return under the influence of torsion springs 194, 196). When the handle 76 and plate 152 are again in the centered or "home" position the end 184 of pawl 180 will pick up the tooth to the left of the tooth which is originally engaged. The action just described may be repeated to go from No. 1 transition position to No. 2 transition position, and again repeated to go to No. 3 transition. Repeating the action a fourth time will, of course, place the selector assembly in the No. 4 transition position. If it is desired to go from No. 4 transition position to No. 3, from No. 3 to No. 2, etc. the selector handle 76 is turned from its center position to the left (clockwise) until it abuts the left-hand side of escutcheon 66. The plate 152 will then be turned to the left (clockwise) and the end 178 of pawl 166 will turn plate 144 and cam drum 134 to the right. The plates 146, 144 and drum 135 will then, as previously described, remain in the new position. The handle 76 with plate 152, however, will be again returned to the centered or "home" position where the end 178 of pawl 166 will pick up the tooth to the right of that previously engaged. It will be observed that without the trip latches 206, 212 it is possible to move the cam drum 134 to either the right or left one position, but that the drum would not remain in the new position because both pawls 166, 180 would be engaging teeth. For this reason trip latch 206 has been provided to cam pawl 166 away from teeth 148 when handle 76 and plate 152 are turned to the right. When handle 76 is released and returned along with plate 152 to the centered position by springs 194, 196 acting between pin 154 and the right hand inside edge of cover plate 121, as already mentioned, the surface 210 on trip latch 206 along with spring 170 will direct the end 178 of pawl 166 into engagement with the next adjacent tooth to the left of that previously engaged. Pawl 180 and trip latch 212 function similarly when handle 76 and plate 152 are moved to the left.

From the foregoing description regarding the operation of the selector handle and selector assembly it will be appreciated that a certain minimum delay must take place in going from one selector position to the next. This delay (which cannot be overcome by the operator), as already mentioned, is extremely important since it protects the heavy current switches from injuries which might result from too rapid transition taking place. As stated, these heavy current switches are actuated in various combinations by control circuits energized by the small switches 142 mounted on the switch chassis 104, the switches 142 being actuated in different combinations by the position of the cam drum 134 which is provided with cam surfaces 138 engaging switch actuating rollers 140.

It was previously stated that the selector cam drum 134 and plates 144, 146 are keyed to selector shaft 128 by flat portions 136. Turning cam drum 134 to its various operating positions in the above-described manner then will also turn indicator 130 and selector interlocking plate 216 since they are fixed to shaft 128. In this way the various selector positions will be indicated by indicator 130 and indexed by the spring-loaded ball detent 220 engaging in holes 224 of selector interlocking plate 216.

The throttle handle 80 and the mechanism which it controls and operates will now be described: Referring first to Fig. 2 it will be noted that the top wall 110, the upper plate 98 and the lower plate 94 are provided with a second set of bushings 226, 228, 230, respectively, in alignment with each other. The bushings 226, 228, 230 act as bearing means for the throttle shaft 232. Mounted on the throttle shaft and keyed thereto by means of flat surfaces 234 is a throttle cam drum 236. As observed in Figs. 2 and 10 the throttle cam drum 236 normally rests on a throttle handle assembly 238 which is fixed to the shaft 232 and rotates therewith. The throttle handle assembly 238 comprises the aforementioned throttle handle 80 which is fixed to the shaft 232 by clamping means 240 and which will rotate the shaft when turned due to the flat surfaces 234. The throttle handle assembly 238 also includes a flanged plate 244 having a hole 246 approximately in the center thereof. The plate 244 is provided with a hole 248 through which a reduced portion 250 of throttle handle 80 extends. The aforementioned clamping means is secured to the reduced portion 250. A washer 252 is secured to the end of the reduced portion 250 at the point where the ends of the clamping means 240 enter the reduced portion. The washer 252 and an inner surface 254 defining one side of the hole 246 has interposed therebetween a leaf spring 256. The leaf spring 256 acts to resiliently hold a second inner surface 258 on plate 244 partially defining hole 246 against the shaft 232 thereby taking up any clearance between shaft 232 and the plate 244.

In Figs. 2 and 7 it may be observed that near the lower end of the shaft 232 there is fixed for rotation therewith a bushing 260 which in turn is fixed to the throttle interlocking plate 262. The interlocking plate 262 is provided with a plurality of holes 264 corresponding to the various aforementioned throttle settings (see Fig. 9). These throttle positions have been placed on throttle interlocking plate 262 for the purpose of aiding in describing applicant's invention. These throttle settings or positions are indexed by a pair of spring-loaded ball detents 266 and 268 located on opposite sides of the throttle interlocking plate 262 and adapted to engage the aforementioned holes 264. To indicate which throttle setting has been selected, a throttle indicator has been provided on the selector shaft 128. The throttle indicator 270 may freely turn on selector shaft 128 and is operatively coupled to shaft 232 by means of a link 272 (see Fig. 4) having its ends pivotally secured to indicator 270 and throttle cam drum 236. After the directional handle has been placed in either forward or reverse and the selector handle 76 is placed in a suitable transition position the throttle handle may be moved to any desired throttle position. Movement of the throttle handle 76 turns the throttle cam drum 236 which as may be noted in Fig. 4 operates the stack of switches 143 in various combinations by means of the operating surfaces 239 engaging the switch actuating rollers 241.

As previously mentioned the throttle handle 76 is also used to control the dynamic braking rheostat when dynamic braking of the locomotive is desired. Referring now to Figs. 2 and 4 it will be noted that the throttle drum 236 is connected to the selector drum 134 by a link 274 pivotally secured to the back wall 112 of switch chassis 104. One end of link 274 is provided with a pivoted slide 276 which engages in a circumferential groove 278 provided in throttle cam drum 236. The opposite end of link 274 is provided with a roller 280 engaged by a circumferential groove 282 in selector cam drum 134. The circumferential groove 282 is provided with a helical portion 284. When the selector handle 76 is "pumped" to the left the necessary number of times to place the selector drum in the "B" position, the roller 280 will roll through the helical portion 284 causing the link 274 to pivot about the point 286 where it is attached to the switch chassis back wall 112. This pivotal movement of link 274 will cause the end carrying the sliding block 276 to move upwardly. Movement of the sliding block upwardly because of its location in circumferential groove 278 will cause throttle drum 236 to move upwardly on throttle shaft 232 so as to render the throttle drum ineffective to actuate the stack of low voltage control switches 143 normally energized during power operation of the locomotive. The link 274 may be adjusted between the throttle and selector drums by reason of the eccentricity of its pivot 286. Referring to Fig. 2 it may be observed that the lower end of shaft 232 is connected to a member 288 including a gear segment 290. The gear segment 290 engages a gear provided on the dynamic braking rheostat 292 which is rotated to determine the amount of dynamic braking for any particular locomotive speed. It should be appreciated from the foregoing description that movement of the selector handle to the "B" position renders the throttle drum ineffective to control any throttle operations. Additionally, when the selector mechanism is placed in the "B" position the stack of switches 142 are activated in a suitable combination so that the dynamic braking rheostat becomes operative. (This is done in a well-known manner by means of suitable control circuits which need not be described here since these circuits do not form any part of the present invention.)

When the locomotive is connected for dynamic braking; i. e., the selector mechanism is in the "B" position, it is desirable that no indexing positions be felt with the manually operated handle used to control the dynamic braking rheostat. Since the handle controlling the magnitude of dynamic braking in the present controller is the throttle handle and since, as previously described, the throttle handle already has positions which are indexed during power operation, means must be provided to eliminate this indexing and provide only a slight resistance to throttle handle movement during dynamic braking. Referring to Figs. 2, 7, 8, 9 and 11 it will be noted that the detent means 266 and 268 are secured in a U-shaped link 294 which is pivotally attached to upper and lower plates 98 and 94, respectively, by stud 296 passing through bushing 298. Also pivotally connected between upper and lower plates 98 and 94 at 300 is a clevis roller assembly 302. The clevis roller assembly 302 is provided with a roller 304 having an operating surface 306 of relatively small diameter and a second operating surface 308 of relatively large diameter. Connecting the free end of U-shaped link 294 and the roller end of clevis roller assembly 302 is a link 310. One end of link 310 is provided with a hole 312 through which the upper detent means 266 passes. Adjacent the opposite end of link 310 is an angular slot 314 in which the end of roller 304 having the relatively small diameter operating surface resides. The end of link 310 adjacent the angular-shaped slot 314 is provided with a projecting shoulder 316. When the selector interlocking plate 216 is in the "off" position; i. e., the position shown, a pin 318 anchored therein abuts the shoulder 316. If the selector interlocking plate 216 is moved to the "B" position by the selector handle, the pin 318 will cause the end of link 310 to move so that the operating surface 306 engages the end 320 of slot 314. However, when the selector interlocking plate 216 is moved to the "B" position, the lobe 322 thereon will be moved clockwise away from surface 308. Now, when the throttle handle is moved from its "idle" position, because of the detent means 266 and 268, there will be a tendency for the link 310 to move to the right as viewed in Fig. 9. Such movement is possible because the detent means 266 is free to move in the enlarged hole 324 provided in upper plate 98, the operating surface 308 may enter the recess 326 provided in selector interlocking plate 216 and the pin 318 may slide along the slot 328 provided in the end of link 310. This movement of link 310 to the right carries the detent means 266 and 268 to the right so that they no longer engage the holes 264 provided in throttle interlocking plate 262. The detent means 266 and 268, however, do offer slight resistance to the movement of throttle interlocking plate 262 and, consequently, to the operation of throttle handle 80 which is used to operate the dynamic braking rheostat. A segmental stop 317 is secured to selector interlocking plate 216 which prevents movement of link 310 to the right when the selector interlocking plate is moved into any of its transition positions during power operation of the locomotive and when definite indexing of the throttle positions is desired.

One further feature of the throttle control handle assembly which should be mentioned before proceeding with the description of the directional handle assembly is that the throttle handle is provided with an emergency stop position which can be attained by pulling on the throttle handle in a direction away from the main controller assembly. Referring for a moment to Fig. 10, it may be observed that the throttle handle 80 includes a sheath 330 encircling a throttle handle shaft 332. One end of the sheath 330 abuts the reduced portion 250 and is maintained in engagement therewith by means of a spring 334 located in a recess 336 in the opposite end of sheath 330. The spring 334 encircles the shaft 332 and is interposed between the sheath 330 and a nut and washer assembly 338 secured to the end of shaft 332. Before the throttle handle 80 can be moved to the emergency stop position the sheath 330 must be pulled outwardly away from the controller assembly so that it compresses the spring 334. This will enable an abutment on the sheath 330 to clear a stop provided on and forming a part of the escutcheon 68 at the extreme right-hand side thereof. It should be appreciated that regardless of the throttle position this emergency stop position may be reached by merely pulling outward on the handle 80 and moving the throttle handle to the right as far as it will go.

The directional control handle assembly, next to be described, comprises a shaft 340 which is suitably supported for rotation by bushings 341 in alignment with each other in upper and lower plates 98 and 94, the lower one of which can be seen in Fig. 16. The shaft 340, as seen in Fig. 16, extends below the plate 94 and has clamped thereto the directional handle assembly indicated generally by a numeral 342. The directional handle assembly including the directional handle 85 will be described with more particularity later. Also secured to the shaft 340 for rotation therewith is a link 344 (see Fig. 4). Mounted on the selector shaft 128 below the selector cam drum 134 primarily for the purpose of compactness is the directional cam drum 346. The directional cam drum 346 has pivotally connected thereto by a pin 347 a link 348. A link 344 is secured to shaft 340 for rotation therewith and is pivotally connected to link 348 by a pin 349 so that upon movement of the directional handle 85 to the right or counterclockwise, as viewed in Fig. 4, the directional cam drum 346 will be turned clockwise. Conversely, movement of the directional handle 85 to the left or clockwise causes turning of the directional cam drum in a counterclockwise direction. Movement of the directional cam drum also controls low voltage control switches in the lower portion of the stack of switches 142. As shown in Fig. 9 there is also secured to the directional shaft 340 for rotation therewith a directional interlocking plate 350. The directional interlocking plate 350 is provided with three recesses 352, 354 and 356 which correspond to Forward, Neutral and Reverse, respectively. These positions are indexed by means of a clevis roller assembly 358 pivotally attached between plates 94 and 96 as at 360. The clevis roller assembly 358 is provided with a roller 362 on the free end thereof which alternately engages the recesses 352, 354, 356 and is maintained in engagement therein by means of a spring detent means including a pin 364 anchored by means of a second pin to plates 98 and 94. The pin 364 is provided with a flanged end which acts as a spring seat for a spring 366 having its opposite end engaging the clevis assembly 358 to urge it in a counterclockwise direction so that the roller 362 is urged into any one of the recesses 352, 354, 356 and tends to hold the directional handle in any one of its three operating positions. As already mentioned, the directional handle is operated by moving it either to the right or the left depending on whether it is desired to move the locomotive in a forward or a reverse direction.

In order to prevent improper operation of the three operating handles of the controller assembly, a unique mechanically operated interlocking mechanism has been provided which is best illustrated in Fig. 9 and will be described in conjunction therewith. This interlocking mechanism includes in one plane the aforementioned selector interlocking plate 216, the throttle interlocking plate 262 and the directional interlocking plate 350, the selector interlocking plate 216 being secured to the selector shaft 128, the throttle interlocking plate 262 being secured to the throttle shaft 232 and the directional interlocking plate 350 being secured to the directional shaft 340. Three clevis roller assemblies are provided which are interposed between these interlocking plates, the aforementioned clevis roller assembly 302, clevis roller assembly 358 and a third clevis roller assembly 368. Clevis roller assembly 302, as already mentioned, is pivotally secured between plates 94 and 98 as at 300. Clevis roller assembly 358 is secured between plates 94 and 98 as at 360. Clevis roller assembly 368 is secured between plates 94 and 98 as at 370. Clevis roller assembly 302, as already mentioned, is provided with a roller 304 at the free end thereof interposed between throttle interlocking plate 262 and selector interlocking plate 216. Clevis roller assembly 358 is provided with two rollers, the aforementioned roller 362 and a second roller 372 both of which are interposed between throttle and directional interlocking plates 262 and 350, respectively. Clevis roller assembly 368 is provided with a roller 374 at its free end which is interposed between the directional and selector interlocking plates. The rollers of the aforementioned clevis roller assemblies engage the contours of the various interlocking plates in different combinations to prevent the operator from improperly moving one or more of the operating handles relative to the other operating handles.

Locking the directional handle so that it cannot be moved from Forward to Reverse or Reverse to Forward with the throttle handle above the No. 1 throttle position is accomplished by the interlocking means in the following way: Again referring to Fig. 9 it will be noted that the throttle interlocking plate 262 is provided with a surface 376 which engages the outer surface 378 of the roller 372 when the throttle interlocking plate 262 has been turned clockwise from the "idle" position in which it is shown to the No. 1 throttle position immediately adjacent the "idle" position. The surface 376 will maintain engagement with the surface 378 of roller 372 for all positions of the throttle above the "idle" position. Engagement between the surfaces 376 and 378 maintains roller 362 in either recess 352 or 356 (corresponding to Forward and Reverse of the directional handle) and prevents clockwise pivoting of the clevis roller assembly 358 about the point 360. In other words, when the roller 362 is in either the recess 352 or the recess 356 it cannot be moved therefrom as long as the surfaces 376 and 378 are in engagement with each other above the "idle" position of throttle. Locking the roller 362 in either of the recesses 352 or 356 prevents rotation of the directional interlocking plate 350 and consequently of the directional shaft 340 and directional handle 85.

Limiting movement of the selector handle so that it cannot be returned to its "off" position when the throttle handle is advanced beyond its "idle" position is accomplished as follows: It will be noted from Fig. 9 that if the selector handle is moved from its "off" position to the No. 1 transition position the selector interlocking plate 216 will be turned in a counterclockwise direction so that the lobe 322 is moved downwardly below the roller 304. If the throttle handle is now operated so that the throttle handle and the throttle interlocking plate 262 are moved beyond the "idle" position, the surface 380 on the throttle interlocking plate will engage the surface 308 and force the clevis roller assembly 302 to pivot clockwise about point 300. This will carry roller 304 to the right into engagement with the surface 382 on the selector interlocking plate. Under these conditions if an attempt is made to return the selector interlocking plate 216 to its "off" position it will be observed that such movement is prevented because the upper surface of its lobe 322 will abut the surface 308 on the roller 304 and prevent clockwise turning of the selector interlocking plate 216 when it is in the No. 1 transition position.

The movement of the throttle handle is limited so that it cannot be advanced beyond its "idle" position when the selector handle is in the "off" position because, as observed in Fig. 9, when selector interlocking plate 216 is in the "off" position the lobe 322 holds the roller 308 against the operating surface of recess 384 thereby preventing clockwise rotation of the throttle interlocking plate 262 from the position pictured in Fig. 9.

It has already been described how the directional handle is interlocked so that it cannot be moved from either its forward or reverse positions when the throttle handle is advanced beyond the "idle" position. The directional handle is additionally locked so that it cannot be moved from either its forward or reverse positions when the selector handle is in transition positions 2, 3 or 4 because the roller 374 will be held in either recess 386 or recess 388 (corresponding to the forward and reverse positions of the directional handle) by the surface 390 which is located below the roller 374 when the directional handle is in either the forward or reverse positions and the selector handle is in transition positions 2, 3 or 4.

The directional handle is interlocked so that it cannot be moved to either the forward or reverse positions when the selector handle is in its braking position by the surface 392 on the selector interlocking plate 216 which maintains the roller 374 in either the recess 386 or the recess 388.

Interlocking the selector handle so that it cannot be moved from the braking position until the throttle handle when operating as a dynamic braking control is brought back to the zero brake position is accomplished as follows: When the selector interlocking plate 216 is turned clockwise so that it is in the "B" or braking position the recess 326 will be located to the right opposite the roller 304 which will be moved into the recess 326 by the surface 380 when the throttle handle and the throttle interlocking plate 262 are turned in a clockwise direction to apply dynamic braking. The surface 380 will maintain the roller 304 in the recess 326 and prevent any further rotation of the selector interlocking plate until the throttle interlocking plate 262 is turned counterclockwise in a direction to reduce the amount of dynamic braking to zero at which time the recess 384 will be located to the left and opposite the roller 304.

When the directional handle is in the neutral position, i. e., with the directional interlocking plate 350 in the position shown, movement of the selector handle is limited to either its "off" or No. 1 transition position by a lobe 394 which holds the roller 374 in the recess 396 of selector interlocking plate 216. Recess 396 is large enough so that the opposite sides thereof allow limited movement in either direction of the selector interlocking plate 216, this limited movement corresponding to the "off" and No. 1 transition positions of the selector handle.

It will be noted that the directional handle may be moved to any of its positions when the selector handle is either in its "off" or No. 1 transition positions but only when in these two positions because the roller 374 will reside in the recess 396 so that the lobe 394 can clear the roller 374 when the directional handle is turned clockwise or counterclockwise to the reverse and forward positions.

Movement of the throttle handle to the emergency "stop" position, i. e., so that the hole in throttle interlocking plate corresponding to the emergency "stop" position is between ball detents 266 and 268, may be made regardless of the position of either the selector or directional handles, because, as observed in Fig. 9, there is nothing to prevent counterclockwise turning of throttle interlocking plate 262 except the spacer 96 at the lower left of the figure which is abutted by the shoulder 402 when the throttle handle is in the emergency "stop" position.

It should be appreciated from the foregoing descriptions regarding the various operating features of this interlocking mechanism that the selector handle or any of the parts of its associated mechanism may be omitted without affecting the prescribed interlocking between the throttle or directional handles.

It may be observed that the extreme rotary movements of the selector interlocking plate 216 are limited by one of the spacers 96 located between the plates 94 and 98 located in the lower right-hand corner as viewed in Fig. 9. This spacer serves as a stop against which the shoulders 398 and 400 abut after the maximum counterclockwise or clockwise movements of selector interlocking plate 216. As already mentioned, a second spacer 96 located between the plates 94 and 98, which is located in the lower left-hand corner as viewed in Fig. 9, serves as a limit stop for the movement of the throttle interlocking plate 262. It will be observed that the throttle interlocking plate 262 is provided with abutting shoulders 402 and 404 which engage the aforementioned spacer 96 and limit rotation of interlocking plate 262. Movement of directional interlocking plate 350 is limited by the lobes 406, 408 which abut the roller 374.

If the locomotive is not to be equipped with dynamic braking the spacer 96 located in the lower right-hand corner of Fig. 9 may be modified to include an adapter 410 as seen in Fig. 20. The adapter 410 will prevent counterclockwise movement of the selector interlocking plate 216 from the position shown. This will eliminate the "B" or dynamic braking position of the selector assembly.

In case the locomotive is to be equipped with automatic transition there would be no need for the transition positions 2, 3 and 4. To limit movement of the selector interlocking plate 216 and the selector mechanism provision is made for securing a pin or other suitable stop at 412 which will limit the counterclockwise movement of the selector interlocking plate 216 so that it can only be turned to transition position No. 1.

In order to prevent the operation by unauthorized personnel of the controller and the locomotive controlled thereby a locking means which is operated by the removal of the directional handle when in the neutral position has been provided. This locking means is shown more particularly in Figs. 7 through 9 and 16 through 19. Referring for a moment to Figs. 16 and 19, it may be observed that located immediately below the plate 94 is a locking plate 414. This locking plate 414 is pivotally secured to blocks 415 fastened to the upper side of plate 94 by means of ears 416 extending upwardly through slots 418 and having holes therein through which extend pins 420 protruding outwardly from the opposite ends of the aforementioned blocks 415. Secured in the plate 94 and extending downwardly therefrom through holes in appendages 422 forming portions of locking plate 414 are a pair of studs 424. Threaded to the lower ends of studs 424 are nuts 426. Interposed between the nuts 426 and the appendages 422 and encircling the shanks of studs 424 are helical springs 428 which urge the ends of the appendages 422 toward the underside of plate 94 causing the locking plate 414 to pivot in a counterclockwise direction (as viewed in Fig. 16) about the pins 420. Secured to locking plate 414 forward of the blocks 415 are a pair of upwardly projecting locking pins 430 and 431 which extend through holes 432 and 433 in plate 94. In alignment with hole 432 and adapted to receive the upper end of pin 430 when the throttle interlocking plate 262 is in the "idle" position is a hole 434 in throttle locking plate 262. A similar hole 435 is provided in the selector interlocking plate 216. When the selector interlocking plate 216 is in the "off" position the hole 435 is in alignment with the hole 433 and is adapted to receive the upper end of pin 431.

From the foregoing description it should be appreciated that if the throttle interlocking plate 262 and the selector interlocking plate 216 are in the "idle" and "off" positions, respectively, and the locking plate 414 is pivoted a sufficient amount about the pins 430 against the action of springs 428 the upper ends of the pins 430 and 431 will enter the holes 434 and 435 and prevent any movement of the throttle and selector handles 80 and 76, respectively. In order to move the forward end of the locking plate upwardly so that the upper ends of the pins 430 and 431 engage in the holes 434 and 435, respectively, the directional handle assembly 342 has been provided. As more particularly noted in Figs. 16, 17 and 18 this assembly includes a hollow shaft 436 secured through a flange 438 to a clamping device 440. The clamping device engages the lower end of the directional shaft 340 and is clamped thereto by means of a bolt assembly 442. Encircling the hollow shaft 436 and adapted to slide therealong is a sleeve 444. The sleeve 444 is provided with upper and lower holes 446, 448 and the hollow shaft 436 with upper and lower elongated slots 450 and 452 through which a stud 454 extends. The stud 454 is secured to the sleeve 444 by means of a flanged portion 458 and nut 456 and moves therewith. By elongating the slots 450 and 452 in shaft 436 the sleeve 444 and stud 454 are allowed movement therealong which is limited by the length of the slots 450 and 452 and also the surface 460 on locking plate 414. Hollow shaft 436 is provided with a third slot 462 for reception of a key 464 attached to rod 466 secured to the directional handle 85. The rod 466 is received in the hollow portion of hollow shaft 436. It will be noted that the key 464 has a notch 468 in which a detent 470 on the forward end of the locking plate 414 is normally engaged. Located in the directional escutcheon plate 70 is a slot 472 which, when the directional handle 85 is located in the neutral position, enables the key 464 to be drawn therethrough.

Assuming the throttle handle to be in the "idle" position and the selector handle to be in the "off" position and it is desired to lock the controller so that it cannot be operated by unauthorized personnel, the directional handle 85 must first be turned to the "neutral" position. It may then be drawn outwardly so that the key 464 on rod 466 passes through the slot 472 in the escutcheon plate 70. Drawing the key 464 outwardly causes the detent 470 to move upwardly out of the notch 468 causing the ends of the pins 430 and 431 to enter the holes 434 and 435 provided in the throttle and selector interlocking plates 262 and 216, respectively. To assure that the pins 430 and 431 will remain in the holes 434 and 435 when the directional handle 85, including the key 464 and rod 466, is removed a spring 474 has been interposed between the flange 438 and an end of sleeve 444. This will urge the sleeve outwardly along the hollow shaft 436 until the upper portion of stud 454 abuts the surface 460 on locking plate 414. This outward movement of sleeve 444 will not be prevented by the detent 470 since the underside of the detent will be residing on the surface 476 of the key 464 and the sleeve 444 will be urged against the end 477 as the handle 85 and the key 464 are drawn outwardly through slot 472 and hole 473. After the handle 85, including key 464, has been entirely removed the detent 468 will rest on the surface 478 on the end of sleeve 444. This position of detent 470 will maintain the upper ends of pins 430 and 431 in the holes 434 and 435 when the handle 85 and key 464 have been removed thereby locking the entire controller assembly against operation.

To again render the controlled assembly operative it is merely necessary to reinsert the rod 466 along with the key 464 in the hole 473 and slot 472, pushing the handle 85 inwardly so that the end 477 of the key 464 pushes the sleeve 444 along the hollow shaft 436 and compresses the spring 474 until the detent 470 is again engaged in the notch 468. The detent 470 will be forced into the notch 468 by means of the springs 428. With the detent again in notch 468 the pins 430 and 431 are removed from the holes 434 and 435, respectively, and the controller mechanism again becomes completely operable.

I claim:

1. In a locomotive controller, a throttle handle assembly having a plurality of operating positions including an idle position, a first throttle position above said idle position, and a series of throttle positions above said first throttle position, a directional handle assembly having a forward operating position and a reverse operating position, and interlocking means associated with said assemblies to prevent movement of said directional handle assembly from either of said forward or reverse operating positions when said throttle handle assembly is above said first throttle position comprising cam surfaces associated with said assemblies having irregularities corresponding to said operating positions and movable thereby, and movable pieces connecting said surfaces in predetermined interrelationships due to said irregularities.

2. In a locomotive controller, a selector handle assembly having a plurality of locomotive transitional positions and an off position, a throttle handle assembly having a plurality of throttle positions including an idle throttle position and a first throttle position above said idle position, and interlocking means associated with said assemblies to prevent movement of the selector handle to its off position when the throttle handle is advanced beyond its idle position comprising a cam surface associated with each of said assemblies having irregularities corresponding to the operating positions thereof and movable thereby, and follower means interposed between said surfaces which due to said irregularities interrelate the movements of said assemblies.

3. In a locomotive controller, a directional handle assembly having a forward and a reverse operating position, a selector assembly having a plurality of locomotive transition positions and a dynamic braking position, and interlocking means associated with said assemblies to prevent movement of the directional handle assembly from either of said forward or reverse operating positions when the selector handle assembly is in said braking position comprising a cam surface associated with each of said assemblies having irregularities corresponding to the operating positions thereof and movable thereby, and follower means engageable with both of said surfaces which interrelate the irregularities thereof to control the relative operations of said assemblies.

4. In a locomotive controller, a throttle handle assembly having a plurality of operating positions including an idle position and a first throttle position above said idle position, a selector handle assembly having a plurality of locomotive transition positions and an off position, and interlocking means associated with said assemblies to prevent advancement of said throttle handle assembly beyond its idle position when said selector handle assembly is in its off position comprising a cam surface associated with each of said assemblies having portions corresponding to the operating positions thereof and movable thereby, and follower means engageable with both of said surfaces which limit movements of said surfaces to predetermined relationships to each other due to said portions.

5. In a locomotive controller, the combination of a switch chassis, a plurality of locomotive transition control switches mounted in a stack on said switch chassis, said stack of switches having actuating mechanisms therefor, a selector shaft rotatably mounted in said controller, a selector cam drum mounted on said shaft for rotation therewith, said sleector cam drum having operating cam surfaces engageable with the actuating means of said stack of control switches, said selector cam drum being turnable to a plurality of positions corresponding to an off position and a plurality of locomotive transition positions, an operating selector handle, and means operatively connecting said handle to said drum and limiting the turning of said cam drum to a single position change when said handle is operated in only one direction comprising a pair of ratchet plates and pawls associated with said drum and handle wherein said pawls are adapted to engage the teeth of said ratchet plates in opposition to each other, springs maintaining said pawls against said teeth, and a pair of keys to allow said pawls to be effective to limitedly turn said shaft in opposite directions when said handle is actuated.

6. In a locomotive controller, a selector handle assembly having a plurality of locomotive transition positions and a dynamic braking position, a throttle handle assembly having a plurality of throttle operating positions, means interlinking said throttle handle assembly and said selector handle assembly so that when said selector handle is in said braking position said throttle handle operates as a dynamic brake control, and interlocking means associated with said selector handle assembly and said throttle handle assembly to prevent movement of said selector handle assembly from said braking position except when said throttle handle assembly is in a zero dynamic braking position comprising a cam surface associated with each of said assemblies having portions corresponding to the operating positions thereof and movable thereby, and follower means engageable with both of said surfaces which limit movements of said surfaces to predetermined relationships to each other due to said portions.

7. A controller for a diesel electric locomotive, including in combination a switch chassis, a plurality of control switches controlling the speed of the engine of said locomotive mounted in a stack on said chassis, said switches having actuating mechanisms therefor, a throttle shaft rotatably mounted in said controller, a throttle cam drum mounted on said shaft for rotation therewith, said drum having cam surfaces engageable with the actuating mechanisms of said switches, a throttle handle operatively connected to said drum for rotation of said drum and said shaft, said drum being rotatable to a plurality of throttle operating positions corresponding to an idle position for said engine and a plurality of throttle positions therefor above said idle position, a second stack of switches mounted on said switch chassis, said second stack of switches having actuating mechanisms therefor, a selector shaft rotatably mounted in said controller, a selector cam drum mounted on said shaft for rotation therewith, a selector handle operatively connected to said selector cam drum, said selector cam drum having operating cam surfaces engageable with the actuating means of said second stack of control switches, said selector cam drum being turnable by said selector handle to a plurality of positions corresponding to an off position and a plurality of transition positions for said locomotive above said off position, interlocking plates secured to said shafts for rotation therewith and having interlocking cam surfaces thereon, and a roller assembly pivotally mounted in said controller and including a roller and arm pivotally disposed between said interlocking plates wherein said roller is engageable with the cam surfaces thereon to prevent advancement of said throttle handle beyond said idle position when said selector handle is in said off position.

8. In a locomotive controller, a directional handle assembly having a forward position and a reverse position, a selector handle assembly having a plurality of locomotive transition positions including a first transition position and transition positions above said first transition position, a throttle handle assembly having a plurality of operating positions including an idle position, and interlocking means associated with said assemblies to prevent movement of said directional handle assembly from either of said forward or reverse operating positions when said selector handle assembly is in a transition position above said first transition position and said throttle handle is advanced beyond said idle position comprising a cam surface associated with each of said assemblies having portions corresponding to the operating positions thereof and movable thereby, and follower means engageable with both of said surfaces which limit movements of said surfaces to predetermined relationships to each other due to said portions.

9. A locomotive controller for a diesel electric locomotive, comprising a switch chassis, a plurality of control switches for controlling the speed of said diesel mounted in a stack on said chassis, said switches having actuating mechanisms therefor, a throttle shaft rotatably mounted in said controller, a throttle cam drum keyed to said shaft for rotation therewith, said drum having cam surfaces engageable with the actuating mechanisms of said switches, means to rotate said drum and said shaft comprising a throttle handle secured to said drum, said drum being rotatable to a plurality of throttle operating positions for operating said switches corresponding to an idle position and a plurality of throttle positions above said idle position, a second stack of switches mounted on said switch chassis, said second stack of control switches having actuating mechanisms therefor, a selector shaft rotatably mounted in said controller, a selector cam drum mounted on said selector shaft for rotation therewith, a selector handle operatively connected to said selector cam drum, said selector cam drum having operating cam surfaces engageable with the actuating means on said second stack of control switches, said selector cam drum being turnable by said selector handle to a plurality of positions corresponding to an off position and a plurality of locomotive transition positions above said off position, interlocking plates secured to said shafts for rotation therewith and having interlocking cam surfaces thereon, and a roller assembly pivotally mounted in said controller and including a roller and arm pivotally disposed between said interlocking plates wherein said roller engageable with said cam surfaces thereon to prevent movement of the selector handle to its off position when said throttle handle is advanced beyond said idle position.

10. In a locomotive controller, a directional handle assembly having a forward operating position, a reverse operating position, and a neutral position, a selector handle assembly having an off position, a first transition position and a plurality of transition positions above said first transition position, and interlocking means associated with said assemblies allowing movement of said directional handle to any of its positions only when the selector handle is in said off or first transition position comprising a cam surface associated with each of said assemblies having portions corresponding to the operating positions thereof and movable thereby, and follower means engageable with both of said surfaces which limit movements of said surfaces to predetermined relationships to each other due to said portions.

11. In a locomotive controller, a selector handle assembly having an off position, a first transition position and a plurality of locomotive transition positions above said first transition position, a directional handle assembly having forward and reverse positions and a neutral position therebetween, and interlocking means associated with said assemblies limiting movement of said selector handle assembly between said off position and said first transition position when said directional handle assembly is in said neutral position comprising cam plates associated with said assemblies having cam surfaces with irregularities corresponding to said operating positions and movable thereby, and movable pieces interposed between said surfaces and engageable thereby to be in combination with the irregularities thereon control the operation of one of said assemblies relative to the other of said assemblies.

12. In a locomotive controller, the combination of a switch chassis, a plurality of control switches mounted in two separate stacks on said chassis, actuating mechanisms for said switches, a throttle shaft rotatably mounted in said controller, a throttle drum mounted on said shaft for rotation therewith, said drum having cam surfaces engageable with the actuating mechanisms of one of said stacks of switches, means to rotate said drum and said shaft comprising a throttle handle secured to said drum, said drum being rotatable to a plurality of throttle operating positions for operating the switches in the one of said stacks corresponding to an idle position and a plurality of throttle positions above said idle position, a selector shaft rotatably mounted in said controller in parallel relation to said throttle shaft, a selector drum mounted on said selector shaft for rotation therewith, said selector cam drum having operating cam surfaces engageable with the actuating means of a portion of the other of said stacks of control switches, a selector handle operatively connected to said selector cam drum, said selector cam drum being turnable to a plurality of positions corresponding to an off position and a plurality of locomotive transition positions, a directional shaft rotatably mounted in said controller in parallel relation to said selector shaft, a directional handle removably connected to said directional shaft, a directional cam drum mounted on said selector shaft, a linkage operatively connecting said directional shaft with said directional cam drum for rotating said directional cam drum on said directional shaft, said directional cam drum having operating cam surfaces engageable with the actuating means of the remaining portion of the other of said stacks of control switches, said directional cam drum being turnable to a plurality of positions corresponding to a forward position, a reverse position, and a neutral position by said directional handle, interlocking plates secured to said shafts for rotation therewith, said interlocking plates having interlocking cam surfaces thereon, a plurality of roller assemblies pivotally mounted in said controller and including rollers mounted on pivoted arms disposed between said interlocking plates and engageable with said cam surfaces thereon to interlock said shafts to thereby control movement of said shafts relative to each other, and locking means operable by removal of said directional handle when in said neutral position to lock said plates against movement relative to each other.

13. In a controller, two manually operated assemblies each having a plurality of operating positions, and interlocking means associated with said assemblies to relate the movements of said assemblies comprising a cam surface associated with each of said assemblies having portions corresponding to the operating positions thereof and movable thereby, and follower means engageable with both of said surfaces which limit movements of said surfaces to predetermined relationships to each other due to said portions.

References Cited in the file of this patent

UNITED STATES PATENTS 2,409,762 Janes ---------------- Oct. 22, 1946